US010447394B2

(12) United States Patent
Kasilya Sudarsan et al.

(10) Patent No.: US 10,447,394 B2
(45) Date of Patent: Oct. 15, 2019

(54) CONNECTION WITH REMOTE INTERNET OF THINGS (IOT) DEVICE BASED ON FIELD OF VIEW OF CAMERA

(71) Applicant: QUALCOMM Incorporated, San Diego, CA (US)

(72) Inventors: Vishnu Vardhan Kasilya Sudarsan, Bangalore (IN); Ganesh Babu Ketti Gangadharan, Bangalore (IN); Rameshkumar Karuppusamy, Bengaluru (IN); Hariprasad Kadavamganam, Bangalore (IN); Somya Gunjan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 15/706,322

(22) Filed: Sep. 15, 2017

(65) Prior Publication Data

US 2019/0089456 A1 Mar. 21, 2019

(51) Int. Cl.
*H04B 10/116* (2013.01)
*H04W 4/38* (2018.01)
(Continued)

(52) U.S. Cl.
CPC .......... *H04B 10/116* (2013.01); *G11B 27/031* (2013.01); *G11B 27/34* (2013.01);
(Continued)

(58) Field of Classification Search
CPC ....... H04M 1/7253; H04W 4/38; H04N 7/185
See application file for complete search history.

(56) References Cited

U.S. PATENT DOCUMENTS 6,141,034 A * 10/2000 McCutchen ........... G02B 27/22
348/36
8,130,978 B2 * 3/2012 Sun ........................ G10L 25/00
381/58

(Continued)

FOREIGN PATENT DOCUMENTS

WO 2017093416 6/2017

OTHER PUBLICATIONS

Gubbi, Jayavardhana, et al. "Internet of Things (IoT): A vision, architectural elements, and future directions." Future generation computer systems 29.7 (2013): 1645-1660.*

(Continued)

*Primary Examiner* — Jimmy H Tran
(74) *Attorney, Agent, or Firm* — Qualcomm Inc (DL)

(57) ABSTRACT

This disclosure provides systems, methods, and apparatus, including computer programs encoded on computer storage media, for network communication when recording audio and video (A/V) of a subject. In one aspect, a device may determine one or more internet of things (IoT) devices that are displayed within a field of view (FoV) of a camera of the device, and that are capable of remote audio recording and audio streaming. The device may select a first IoT device having a first microphone. The device may receive an audio stream from the first IoT device after selecting the first IoT device, the audio stream including the audio of the subject remotely recorded by the first IoT device for the device. When the FoV of the camera changes, the device may dynamically switch from receiving the audio stream from a first IoT device to receiving the audio stream from a second IoT device.

25 Claims, 10 Drawing Sheets

(51) Int. Cl.
*H04M 1/725* (2006.01)
*H04N 7/14* (2006.01)
*H04N 7/18* (2006.01)
*H04W 40/24* (2009.01)
*H05B 37/02* (2006.01)
*G11B 27/031* (2006.01)
*G11B 27/34* (2006.01)

(52) U.S. Cl.
CPC .......... *H04M 1/7253* (2013.01); *H04N 7/147* (2013.01); *H04N 7/185* (2013.01); *H04W 4/38* (2018.02); *H04W 40/246* (2013.01); *H05B 37/0245* (2013.01)

(56) References Cited

U.S. PATENT DOCUMENTS

| | | | |
|---|---|---|---|
| 8,918,461 B2 | 12/2014 | Rimmer et al. | |
| 9,084,068 B2 | 7/2015 | Abrahamsson et al. | |
| 9,413,613 B2 | 8/2016 | Turon et al. | |
| 9,445,449 B2 | 9/2016 | Dees et al. | |
| 9,615,064 B2* | 4/2017 | Millar | H04N 7/181 |
| 9,626,697 B2* | 4/2017 | Rathus | G06Q 30/0259 |
| 9,661,121 B2 | 5/2017 | Singhar et al. | |
| 9,887,864 B1* | 2/2018 | Han | H04W 4/70 |
| 9,942,717 B1* | 4/2018 | Chen | H04W 4/027 |
| 10,127,669 B2* | 11/2018 | Stein | G01C 3/22 |
| 10,365,820 B2* | 7/2019 | Lee | G06F 3/04883 |
| 2003/0117527 A1* | 6/2003 | Smith | H04N 5/44543 348/565 |
| 2003/0160862 A1* | 8/2003 | Charlier | H04N 5/23238 348/14.08 |
| 2004/0037436 A1* | 2/2004 | Rui | H04R 3/005 381/92 |
| 2007/0154068 A1* | 7/2007 | Stein | G01C 3/22 382/106 |
| 2007/0162839 A1* | 7/2007 | Danty | G06F 16/4393 715/203 |
| 2007/0216807 A1* | 9/2007 | Otsuka | H04N 5/45 348/565 |
| 2008/0163379 A1* | 7/2008 | Robinson | G06F 3/04815 726/27 |
| 2008/0276270 A1* | 11/2008 | Kotaru | H04N 21/252 725/34 |
| 2009/0252379 A1* | 10/2009 | Kondo | H04N 5/45 382/107 |
| 2010/0154065 A1* | 6/2010 | Cohen | G11B 27/036 726/28 |
| 2010/0189292 A1* | 7/2010 | Wurzbacher | H04R 25/305 381/313 |
| 2010/0265399 A1* | 10/2010 | Inoue | H04N 7/181 348/500 |
| 2012/0007801 A1* | 1/2012 | Banning | G03B 21/00 345/156 |
| 2012/0124602 A1* | 5/2012 | Tan | G09B 5/06 725/9 |
| 2012/0169882 A1* | 7/2012 | Millar | H04N 7/181 348/159 |
| 2013/0160052 A1* | 6/2013 | Ure | H04N 7/17318 725/34 |
| 2013/0226593 A1* | 8/2013 | Magnusson | H04N 5/765 704/276 |
| 2013/0232430 A1* | 9/2013 | Reitan | G06F 3/0484 715/765 |
| 2013/0258117 A1* | 10/2013 | Penov | G06K 9/6202 348/207.1 |
| 2013/0315404 A1* | 11/2013 | Goldfeder | H04R 3/005 381/58 |
| 2013/0342731 A1* | 12/2013 | Lee | H04N 5/23293 348/231.4 |
| 2014/0143725 A1* | 5/2014 | Lee | G11B 27/34 715/834 |
| 2014/0225924 A1* | 8/2014 | Loxam | G06T 19/006 345/633 |
| 2014/0267400 A1* | 9/2014 | Mabbutt | G06T 19/006 345/633 |
| 2014/0286497 A1* | 9/2014 | Thyssen | H04R 3/005 381/66 |
| 2014/0362253 A1* | 12/2014 | Kim | H04N 5/262 348/231.4 |
| 2014/0365913 A1* | 12/2014 | Santamaria | G06F 3/016 715/748 |
| 2014/0369506 A1* | 12/2014 | Arrasvuori | G01S 3/8083 381/17 |
| 2014/0375683 A1* | 12/2014 | Salter | G06F 3/013 345/633 |
| 2015/0006696 A1* | 1/2015 | Hershberg | H04L 67/12 709/223 |
| 2015/0036881 A1* | 2/2015 | Sharma | H04W 4/70 382/103 |
| 2015/0130957 A1* | 5/2015 | Berelejis | H04L 67/12 348/211.1 |
| 2015/0228309 A1* | 8/2015 | Bartlow | G11B 27/031 386/278 |
| 2015/0293586 A1 | 10/2015 | Kritt et al. | |
| 2016/0021477 A1* | 1/2016 | Hiipakka | H04S 5/005 386/285 |
| 2016/0071524 A1* | 3/2016 | Tammi | H04N 5/77 386/343 |
| 2016/0080684 A1* | 3/2016 | Farrell | H04N 9/8211 386/227 |
| 2016/0173293 A1* | 6/2016 | Kennedy | H04L 12/2814 709/222 |
| 2016/0249134 A1* | 8/2016 | Wang | H04R 3/005 |
| 2016/0252969 A1* | 9/2016 | Lee | G06F 3/0488 345/156 |
| 2017/0105176 A1* | 4/2017 | Finnegan | H04W 52/0229 |
| 2017/0156102 A1 | 6/2017 | Singh et al. | |
| 2017/0245053 A1* | 8/2017 | Virolainen | G10L 19/008 |
| 2017/0265042 A1* | 9/2017 | Choi | H04W 4/04 |
| 2018/0040138 A1* | 2/2018 | Shishalov | G06T 7/564 |
| 2018/0063666 A1* | 3/2018 | Broodney | H04W 4/70 |
| 2018/0249298 A1* | 8/2018 | Jain | H04L 67/18 |
| 2018/0275285 A1* | 9/2018 | Jun | H04W 4/029 |
| 2018/0288569 A1* | 10/2018 | Wang | H04W 4/023 |
| 2018/0310176 A1* | 10/2018 | Abdelhakim | H04W 76/10 |
| 2019/0072638 A1* | 3/2019 | Wang | G01S 5/14 |
| 2019/0073783 A1* | 3/2019 | Stein | G01C 3/22 |

OTHER PUBLICATIONS

Song, Zhexuan, Alvaro A. Cárdenas, and Ryusuke Masuoka. "Semantic middleware for the internet of things." 2010 Internet of Things (IOT). IEEE, 2010.*
Wu, Zhung-Han, et al. "A time-reversal paradigm for indoor positioning system." IEEE Transactions on Vehicular Technology 64.4 (2015): 1331-1339.*
Coppa, Alessandro, "Secure and User-Friendly Commissioning and Bootstrapping of Constrained Devices", Norwegian University of Science and Technology, Dec. 2015, 68 pages.
"PCT Application No. PCT/US2018/047324 International Search Report and Written Opinion", dated Jan. 15, 2019, 17 pages.
"PCT Application No. PCT/US2018/047324 Partial International Search Report", dated Nov. 23, 2018, 12 pages.

* cited by examiner

CONNECTION WITH REMOTE INTERNET OF THINGS (IOT) DEVICE BASED ON FIELD OF VIEW OF CAMERA

TECHNICAL FIELD

This disclosure relates generally to the field of communication systems, and, more particularly to establishing a communication link with a remote internet of things (IoT) device of a communication network.

DESCRIPTION OF THE RELATED TECHNOLOGY

Internet of things (IoT) can refer to network enablement of devices that typically perform some other non-communications function. The IoT devices are embedded with electronics, software, sensors, actuators, and network connectivity components to enable the IoT devices to collect and exchange data and also to be sensed or controlled remotely across existing network infrastructure. For example, users can use devices, such as mobile phones, to run various types of applications that access and control the IoT devices directly or through the network infrastructure to collect data or perform a function.

A user can use a camera application and the related camera components that are available in various types of devices (such as mobile phones, dedicated cameras, tablet computers, drones, or smart glasses) to record audio and video (A/V). When a user uses a device having a camera to record audio and video (A/V) of a subject positioned in the field of view (FoV) of the camera, the video is captured using the camera components of the device and the audio is recorded using the microphone of the same device that is recording the video. However, when the subject being recorded is not at close proximity to the camera (such as being located at a distance greater than five meters away) and is located in a noisy environment, the recorded audio may have a substantial amount of ambient noise. In some cases, the ambient noise may substantially interfere with the target audio from the subject being recorded. For example, the recorded audio of a presenter in a noisy auditorium may have a substantial amount of ambient noise because the microphone is at a distance from the presenter and the environment is noisy. In another example, when recording A/V of a person giving a toast at a wedding or party, the noise in the environment may completely drown out the target audio from the person giving the toast.

SUMMARY

The systems, methods, and devices of this disclosure each have several innovative aspects, no single one of which is solely responsible for the desirable attributes disclosed herein.

One innovative aspect of the subject matter described in this disclosure can be implemented by a computing device for network communication for recording audio and video (A/V). The computing device may determine a plurality of internet of things (IoT) devices that are displayed within a field of view (FoV) of a camera of the computing device and that are capable of remote audio recording and audio streaming. The computing device may select a first IoT device from the plurality of IoT devices. The first IoT device may have a first microphone that is capable of remotely recording audio of a subject for the computing device. The computing device may receive an audio stream from the first IoT device after selecting the first IoT device. The audio stream may include the audio of the subject remotely recorded by the first IoT device for the computing device.

In some implementations, the computing device may determine, within the FoV of the camera of the computing device, distance measurements from each of the plurality of IoT devices to a focal point of the FoV. The computing device may select the first IoT device from the plurality of IoT devices based, at least in part, on the distance measurements.

In some implementations, the computing device may determine, based on the distance measurements, that the first IoT device from the plurality of IoT devices is located closest to the focal point of the FoV. The computing device may select the first IoT device from the plurality of IoT devices based, at least in part, on determining that the first IoT device is located closest to the focal point of the FoV.

In some implementations, the computing device may determine a microphone type and performance characteristics associated with each microphone of each of the plurality of IoT devices. The computing device may compare the microphone type and performance characteristics associated with each microphone of each of the plurality of IoT devices. The computing device may select the first IoT device from the plurality of IoT devices based, at least in part, on the microphone type and performance characteristics associated with the first microphone of the first IoT device.

In some implementations, the computing device may determine that the first IoT device and a second IoT device of the plurality of IoT devices are displayed within a focal area of the FoV of the camera of the computing device. The computing device may receive a first audio stream from the first IoT device and a second audio stream from the second IoT device. The computing device may compare audio quality characteristics of the first audio stream to audio quality characteristics of the second audio stream. The computing device may select the first IoT device based, at least in part, on the audio quality characteristics of the first audio stream received from the first IoT device.

In some implementations, the computing device may receive user input selecting the first IoT device having the first microphone. The computing device may select the first IoT device from the plurality of IoT devices based, at least in part, on the user input.

In some implementations, the computing device may record video of the subject using the camera of the computing device, and generate an A/V recording of the subject using the video of the subject recorded by the camera of the computing device and the audio of the subject remotely recorded by the first microphone of the first IoT device.

In some implementations, the computing device may detect a change in the FoV of the camera of the computing device. The computing device may determine to switch from receiving the audio stream from the first IoT device to receiving an audio stream from a second IoT device after detecting the change in the FoV of the camera. The second IoT device may have a second microphone that is capable of remotely recording the audio of the subject.

In some implementations, the computing device may determine that a second IoT device is located closer to a focal point of the FoV than the first IoT device after detecting a change in the FoV of the camera. The computing device may determine to switch from receiving the audio stream from the first IoT device to receiving the audio stream from the second IoT device in response to determining that the second IoT device is located closer to the focal point of the FoV than the first IoT device after detecting the change in the FoV of the camera.

Another innovative aspect of the subject matter described in this disclosure can be implemented in a computing device comprising a processor and memory having instructions stored therein which, when executed by the processor, cause the computing device to determine a plurality of IoT devices that are displayed within a FoV of a camera of the computing device and that are capable of remote audio recording and audio streaming, select a first IoT device from the plurality of IoT devices, where the first IoT device may have a first microphone that is capable of remotely recording audio of a subject for the computing device, and receive an audio stream from the first IoT device after selection of the first IoT device, where the audio stream may include the audio of the subject remotely recorded by the first IoT device for the computing device.

Another innovative aspect of the subject matter described in this disclosure can be implemented in a computer-readable storage medium having instructions stored therein, which when executed by a processor of a computing device, cause the computing device to determine a plurality of IoT devices that are displayed within a FoV of a camera of the computing device and that are capable of remote audio recording and audio streaming, select a first IoT device from the plurality of IoT devices, where the first IoT device may have a first microphone that is capable of remotely recording audio of a subject for the computing device, and receive an audio stream from the first IoT device after selection of the first IoT device, where the audio stream may include the audio of the subject remotely recorded by the first IoT device for the computing device.

Another innovative aspect of the subject matter described in this disclosure can be implemented by a computing device for network communication. The computing device may detect a second computing device that is located within a FoV of a camera of the first computing device. The computing device may provide a request message from the first computing device to the second computing device in response to detecting the second computing device within the FoV of the camera of the first computing device. The request message may request approval to establish a communication link between the first computing device and the second computing device. The computing device may receive a response message from the second computing device. The response message may grant approval to establish the communication link between the first computing device and the second computing device. The computing device may establish the communication link between the first computing device and the second computing device for the first computing device to communicate with the second computing device.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
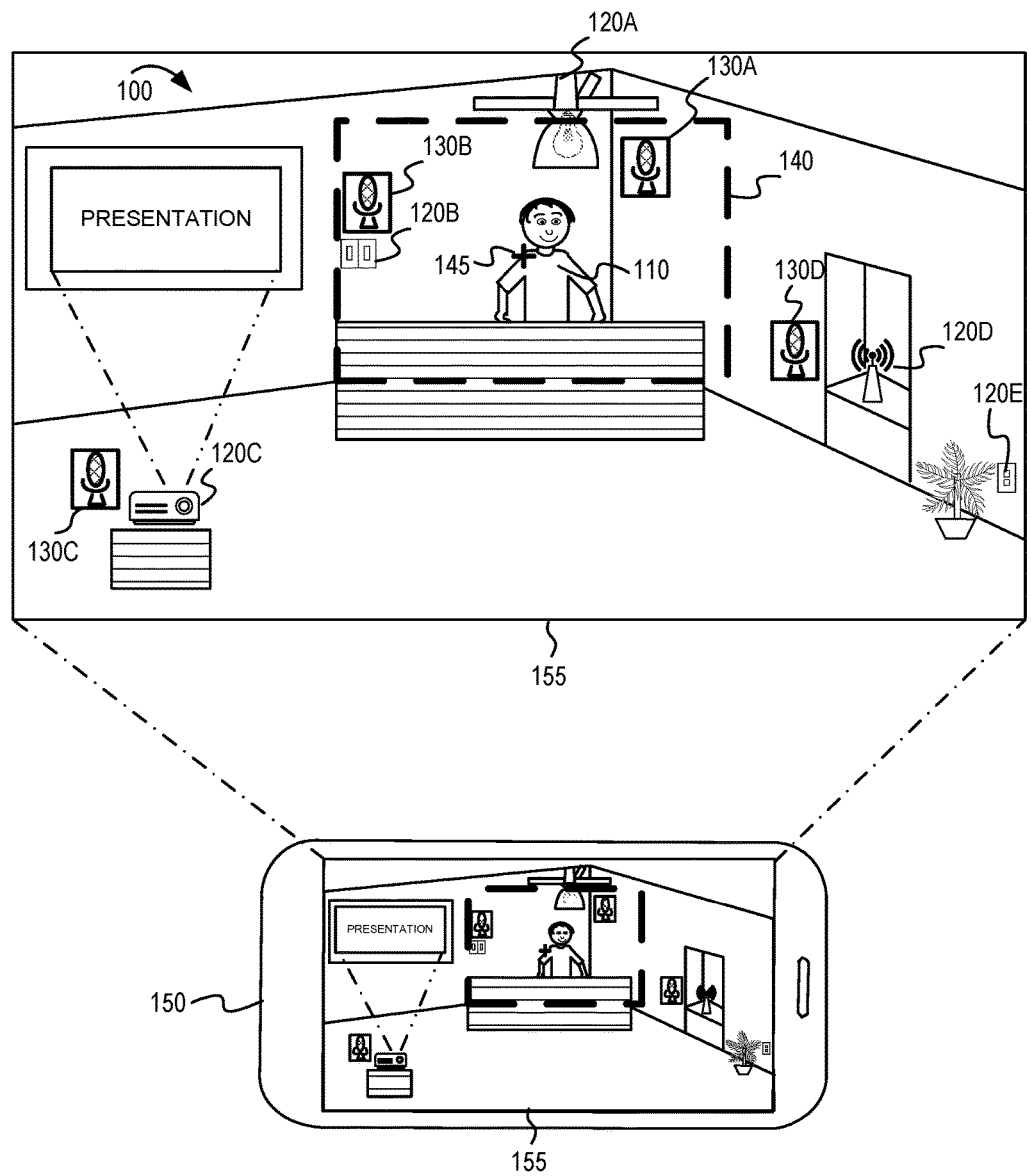
FIG. 1 shows an example diagram of a computing device displaying an internet of things (IoT) environment and selecting one of the IoT devices for remotely recording and streaming audio for an audio and video (A/V) recording of a subject.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

With the proliferation of IoT technology, many devices in homes, businesses, event venues, and other locations may include IoT devices (or will soon be upgraded with IoT devices) that are networked together and connected to the existing network infrastructure, such as through a local area network (LAN) and to the Internet. Many of the IoT devices have microphones that can support voice commands and record audio. Example IoT devices that typically have microphones include smart appliances, smart lighting components (such as smart switches, lighting fixtures, and light bulbs), smart thermostats, smart security system components (such as smart control panels, cameras, and sensors), smart media devices (such as smart televisions, home assistants, projectors, and speakers), smart door locks, dedicated sensors, and the like. Computer-based devices (also referred to herein as "computing devices") can be used to communicate with the IoT devices to remotely access the IoT devices, exchange commands and information with the IoT devices, and control the IoT devices to improve, simplify, and automate day-to-day tasks.

A camera of a computing device (such as a dedicated camera, a mobile phone, a tablet computer, a drone, smart or augmented reality (AR) glasses, or the like) may be used to record audio and video (A/V) of a subject in the field of view (FoV) of the camera. In some instances, the subject being recorded may not be in close proximity to the camera of the computing device (such as being located at a distance greater than a few meters away, like three, four, five or more meters away) and the subject is located in a noisy environment. For example, the subject being recorded may be a presenter in a noisy auditorium or a person giving a toast at a wedding or party. In some implementations, the computing device may obtain the audio for the A/V recording from one or more microphones of one or more remote IoT devices that are located at close proximity to the subject being recorded. For example, a microphone of a remote IoT device may record audio of the user and stream the audio to the computing device. The computing device may capture the video for the A/V recording using the camera of the computing device. Thus, the computing device may record the video locally using the camera components of the computing device, and obtain the audio remotely from one or more microphones of one or more IoT devices of the local network to generate the A/V recording.

When the camera application of the computing device is accessed for recording A/V of the subject, the computing device may display visual indicators (such as icons or markers) in the FoV of the camera showing the location of the IoT devices that have a microphone and that are capable of remotely recording and streaming audio. For example, the computing device may obtain a map of the IoT devices of a local network from a master device of the local network. The computing device may use the map to determine the location of the IoT devices in order to display the visual indicators in the FoV of the camera.

In some implementations, the computing device may select a single IoT device having a microphone that is capable of remote recording and streaming audio for the A/V recording. For example, the computing device may select the IoT device that is closest to the subject being recorded. In another example, the computing device may select the IoT device that has a preferred microphone type and performance characteristics (or specifications). In another example, the computing device may select the IoT device that is streaming the best quality audio to the computing device. In some implementations, the computing device may select two or more IoT devices to remotely record and stream the audio. The two or more IoT devices also may be selected based on at least one of the proximity to the subject being recorded, the microphone type and performance characteristics of the microphones, and the quality of the streamed audio that is received at the computing device. In some implementations, the two or more IoT devices may be selected based on their proximity to one another and to the subject being recorded. In some implementations, the user of the camera also may override the automatic selection of the one or more IoT devices by the computing device, and instead use the display of the computing device to select the one or more IoT devices. Also, the computing device may designate the local microphone of the computing device as the backup microphone in case the communication link with the one or more IoT devices is lost or other issues affect the remote recording and streaming of the audio.

After selecting the one or more IoT devices, the computing device may begin receiving the audio stream from the one or more IoT devices during the A/V recording. In some implementations, when the FoV of the camera changes during the A/V recording, such as by the user moving the camera or the user zooming in or out, the computing device can dynamically switch from receiving the audio stream from a first IoT device to receiving the audio stream from a second IoT device.

In some implementations, a first computing device of a first user may detect a second computing device of a second user that is displayed within a FoV of a camera of the first computing device. For example, the first user wearing a pair of smart glasses looks in the direction of the second user that is also wearing a pair of smart glasses. The first user's smart glasses may detect the second user's smart glasses in the FoV of the camera of the first user's smart glasses. The first computing device may provide a request message to the second computing device to request approval to establish a communication link between the first computing device and the second computing device for the first user to communication with the second user from a distance.

Particular implementations of the subject matter described in this disclosure can be implemented to realize one or more of the following potential advantages. The computing device can generate an A/V recording having good quality audio with reduced ambient noise even when recording A/V from a distance in a noisy environment. The remote recording and streaming of audio from one or more remote IoT devices during the A/V recording of a subject from a distance utilizes the networked IoT environment to greatly improve the audio quality of the A/V recording. The computing device can use the networked IoT environment and the FoV of the computing device's camera to dynamically select and switch between IoT devices to improve the audio quality. The computing device may use two or more IoT devices of the networked IoT environment to improve the audio quality by using noise cancellation. Also, the selection of the one or more IoT devices and the remote recording and streaming of the audio is automatic and seamless, which maintains the ease of use for the user. Furthermore, a first computing device may dynamically and seamlessly connect to a second computing device based on the FoV of the camera of the first computing device to allow the first user to communicate with the second user from a distance.

FIG. 1 shows an example diagram of a computing device displaying an IoT environment and selecting one of the IoT devices for remotely recording and streaming audio for an A/V recording of a subject. The IoT environment may be any indoor or outdoor space in a home, office, commercial building, government building, public park, event venues, and the like, that has IoT devices as part of the network infrastructure. Examples of indoor or outdoor spaces that may have IoT devices include auditoriums, living rooms, backyards, conference rooms, stages, lobbies, classroom, courtyards, amphitheaters, and the like. The IoT environment 100 shown in FIG. 1 is an auditorium that includes IoT devices 120A, 120B, 120C, 120D, and 120E (which may collectively be referred to as IoT devices 120). In the example shown in FIG. 1, IoT device 120A is a smart lighting fixture or a smart light bulb, IoT device 120B is a smart light switch, IoT device 120C is a smart media device (such as a smart projector), IoT device 120D is a home/office assistant or a master device of a local wireless network (such as a wireless LAN access point (AP)), and IoT device 120E is a smart power plug. It is noted that the IoT environment may include additional IoT devices not shown in FIG. 1 for simplicity.

A computing device 150 may be used to record A/V of a subject 110 in the IoT environment 100 from a distance. In the example shown in FIG. 1, the computing device 150 is a mobile phone and the subject 110 being recorded is a presenter in an auditorium. The computing device 150 may be various types of devices that have a camera, such as a mobile phone, a dedicated camera, a tablet computer, a drone, smart glasses, or the like. Smart glasses may include augmented reality (AR) glasses, virtual reality (VR) glasses, or mixed reality (MR) glasses that implement aspects of both AR and VR. To record A/V of the subject 110, the user of the computing device 150 may open the camera application using a touchscreen (or physical buttons) of the computing device 150 or using a voice command. Then, the user may point the camera of the computing device 150 in the direction of the subject 110 in order to display the subject 110 and the IoT environment 100 in the FoV 155 of the camera of the computing device 150, as shown in FIG. 1. For example, the user can place the subject 110 near the center of the focus area 140 of the FoV 155. In one example, when using a mobile phone, the FoV 155 of the camera can be displayed to the user in the main display of the mobile phone, and the user can move the mobile phone to place the subject 100 near the center of the focus area 140. In another example, when using smart glasses, the FoV 155 of the camera can be displayed to the user in one or more displays that may be located in one or more lenses of the smart glasses, and the user can look in the direction of the subject 100 to place the subject 100 near the center of the focus area 140. The center of the focus area 140 also may be referred to as the focal point 145 of the FoV 155. Some cameras display the focus area 140 of the FoV 155 as a rectangle or square with dashed lines, and the focal point 145 with a cross or a dot at the center of the focus area 140. Some cameras display either the focus area 140 or the focal point 145, but not both. Users typically position the subject 110 being recorded within the focus area 140 because the camera's autofocus and other image processing features optimize the focus and improves the overall quality of the portions of the video or image being captured within the focus area 140.

In some implementations, the computing device 150 may determine the general location of the IoT devices 120 and determine whether each of the IoT devices 120 supports remote recording and streaming of audio. As shown in FIG. 1, the camera of the computing device 150 displays (or overlays) visual indicators 130A, 130B, 130C, and 130D (which may collectively be referred to as visual indicators 130) within the FoV 155 of the camera. The visual indicators 130 show the general location of the IoT devices 120 that have a microphone and that support remote recording and streaming of audio in the IoT environment 100. For example, the IoT device 120A is displayed with a visual indicator 130A, the IoT device 120B is displayed with a visual indicator 130B, the IoT device 120C is displayed with a visual indicator 130C, and the IoT device 120D is displayed with a visual indicator 130D. The IoT device 120E is not displayed in the FoV 155 with a visual indicator because the computing device 150 determined that the IoT device 120E doesn't have a microphone or the microphone it has does not support remote recording and streaming of audio.

In some implementations, the computing device 150 may communicate with a master device (such as IoT device 120D) of the local network to obtain a map of the IoT devices 120 of the IoT environment 100. For example, the master device may be a WLAN access point, a local network server, a smart assistant device, or the like. The master device may either store the map of the IoT devices 120 locally or in a remote database accessed via the local network or the Internet. In one example, the computing device 150 may obtain an Indoor Positioning System (IPS) map from the master device that shows the locations of the IoT devices 120 within the IoT environment 100. The IPS map may be predetermined by a network administrator using various indoor positioning techniques that are known in the art. The IPS map may be stored locally at the master device or remotely in a database. The computing device 150 can merge (or overlay) the map of the IoT devices 120 with the camera's FoV 155 to determine the location of the IoT devices 120.

In some implementations, the map of the IoT devices 120 obtained from the master device shows the location of all available IoT devices 120 of the IoT environment 100, including IoT devices that do not have microphones. Thus, in one example, the computing device 150 communicates with the master device to request information about the IoT devices 120, such as to request at least one of the type of IoT device, the operational capabilities of each IoT device, and the specifications of each IoT device. In another example, the computing device 150 can establish a communication link with each of the IoT devices 120 and request the above-referenced information directly from each IoT device. Based on the information received from the master device or directly from the IoT devices 120, the computing device 150 can identify which of the IoT devices 120 have a microphone and support remote recording and streaming of audio. The computing device 150 can then display (or overlay) the visual indicators 130 within the FoV 155 of the camera to show the general location of the IoT devices 120 within the IoT environment 100 that have a microphone and that support remote recording and streaming of audio, as shown in FIG. 1.

In some implementations, the computing device 150 may select one of the IoT devices 120 having a microphone and that is capable of remotely recording and streaming audio for the A/V recording of the subject 110. For example, the computing device 150 selects one of the IoT devices 120 that are displayed with a visual indicator 130. The visual indicator 130 indicates that the IoT device has a microphone and supports remotely recording and streaming audio. If only one of the IoT devices 120 that are shown within the FoV 155 is displayed with a visual indicator 130, the computing device 150 dynamically selects the IoT device for the A/V recording of the subject 110. When two or more IoT devices 120 are displayed with a visual indicator 130 (as shown in FIG. 1), the computing device 150 may select one of the IoT devices. In one example, the computing device 150 may select the IoT device that is closest to focal point 145 of the FoV 155, since users typically place the subject 110 close to the focal point 145 of the FoV 155 when recording video of the subject 110. For example, the IoT device 120A and the IoT device 120B of FIG. 1 are shown within the focus area 140 and are the closest IoT devices 120 to the focal point 145 of the FoV 155 (and also to the subject 110 being recorded). In this example, the computing device 150 may select the IoT device 120A because it is closer to the focal point 145 than the IoT device 120B. In another example, the computing device 150 may compare the microphone types and performance characteristics (or specifications) of the IoT devices 120, or may compare the quality of the audio received from the IoT devices 120. The computing device 150 may select one of the IoT devices 120 with a preferred microphone type and performance characteristics (or specifications), or may select the IoT device 120 that streamed the best quality audio, as will be further described with reference to FIG. 4.

The user of the computing device 150 also can manually select, using the touchscreen of the computing device 150 or by a voice command, one of the IoT devices 120 (such as IoT device 120A) for the A/V recording of the subject 110. The computing device 150 also may detect other types of commands, such as commands based on the user's eye movement and eye blinks or other types of biometric commands. The user also may override the automatic selection of one of the IoT device 120 by the computing device 150 and use the touchscreen of the computing device 150 (or a voice command) to manually select a different IoT device (such as IoT device 120B). When the computing device 150 (or the user) selects one of the IoT devices 120 for the A/V recording, the computing device 150 designates the local microphone of the computing device 150 as a backup microphone in case the communication link with the selected IoT device is lost or there are other network issues. After selecting one of the IoT devices 120, the computing device 150 communicates with the selected IoT device and begins receiving the audio stream from the selected IoT device during the A/V recording, as will be further described in FIGS. 2 and 3.

In some implementations, after the user starts the camera application, the computing device 150 may initially establish a communication link with each of the IoT devices 120 that are displayed with the FoV 155 of the camera or with only the IoT devices 120 that are displayed within the focus area 140 of the FoV 155. The microphones of the IoT devices 120 that establish a communication link with the computing device 150 may be dynamically turned on when communication link is established. The microphones of the IoT devices 120 that do not establish a communication link with the computing device 150 may remain in an off or low power state. Also, after the computing device 150 selects one or more of the IoT devices 120 for the remote audio recording and streaming, the microphones of the IoT devices 120 that are not selected may be turned off or may switch to a low power state. Dynamically switching the microphones on and off depending on whether they are being used by the computing device 150 can reduce power consumption, and also may help extend the life of the batteries of the IoT devices 120 that are battery operated.

Figure 2:
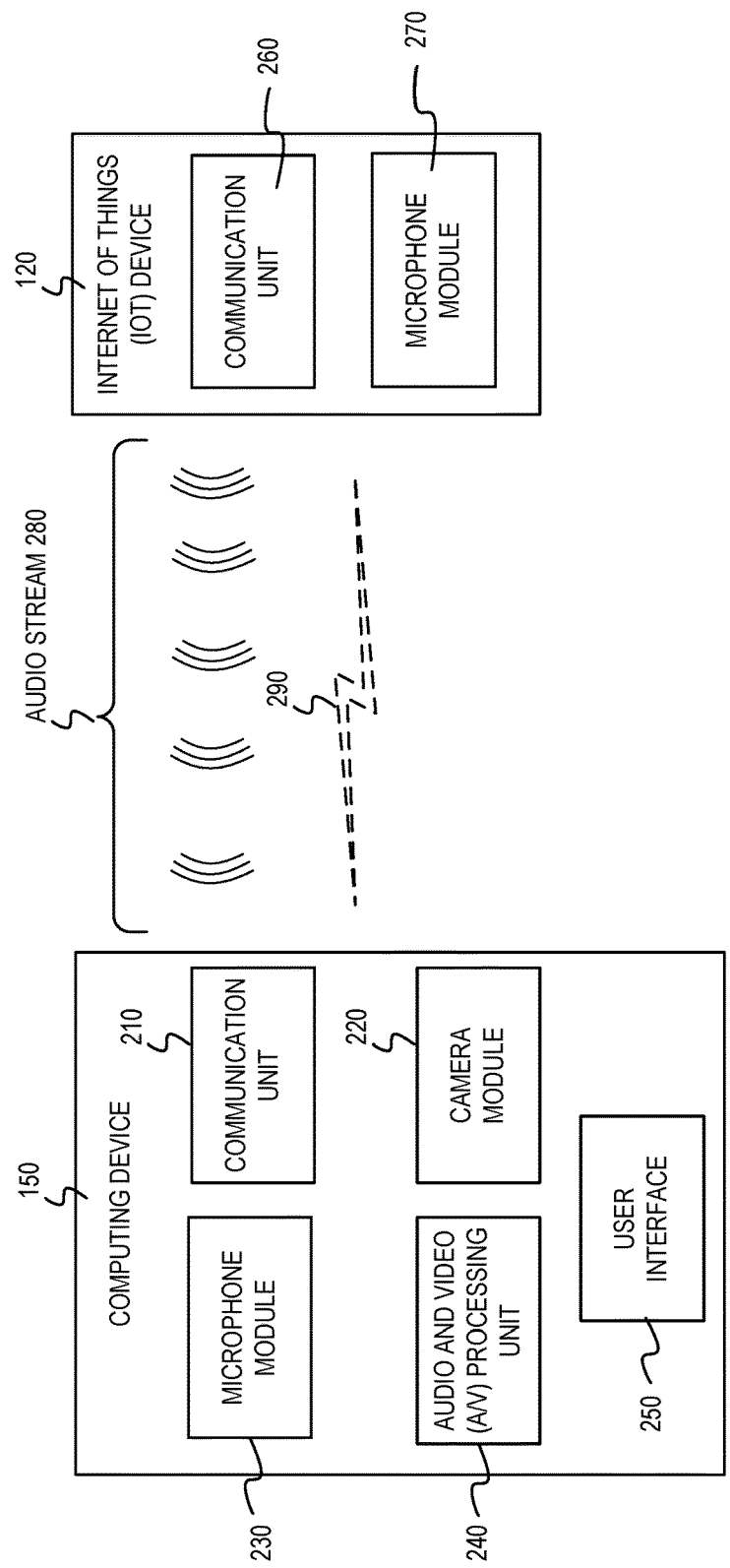
FIG. 2 shows a block diagram of an example computing device and an example IoT device.

FIG. 2 shows a block diagram of an example computing device and an example IoT device. The computing device 150 may include a communication unit 210, a camera module 220, a microphone module 230, an A/V processing unit 240, and user interface 250. The IoT device 120 may be representative of any of the IoT devices 120 of FIG. 1, such as IoT device 120A. The IoT device 120 may include a communication unit 260 and a microphone module 270. The communication units 210 and 260 may each include an analog front end (AFE), one or more antennas, one or more modems (such as a Bluetooth modem and an 802.11 modem), and other related communication components. The camera module 220 may include the camera lenses, flash, and other related camera components. The microphone modules 230 and 270 may each include one or more microphones and other related microphone components. The A/V processing unit 240 may include one or more processor cores, cache, memory, and other related components. In some implementations, the A/V processing unit 240 may be part of the mobile processor(s) or the graphic processor(s) of the computing device 150. The user interface 250 may include the display, touchscreen, speakers, physical buttons, and other related user interface components. The camera module 220, the microphone module 230, and other related sensors also may be part of the user interface components of the computing device 150 in order to detect voice commands, eye movement commands, and other types of biometric commands. It is noted that the computing device 150 and the IoT device 120 may have additional components which are not shown in FIG. 2 for simplicity.

After the computing device 150 selects one of the IoT devices 120 (such as IoT device 120A), the computing device 150 communicates with the selected IoT device 120. For example, the computing device 150 may send a request message with a command 290 (or other type of request message) to the selected IoT device 120 using the communication unit 210, the command requesting the selected IoT device 120 to initiate the remote recording and streaming of the audio. The selected IoT device 120 may optionally send an acknowledge message to the computing device 150. The selected IoT device 120 may then begin recording audio using the microphone module 270, and also transmitting an audio stream 280 to the computing device 150 using the communication unit 260. The computing device 150 may receive the audio stream 280 using the communication unit 210 and provide the audio to the A/V processing unit 240 for further processing. The computing device 150 also may provide the video recorded using the camera module 220 to the A/V processing unit 240 for further processing. When the local microphone of the computing device 150 is recording the audio, the microphone module 230 provides the audio to the A/V processing unit 240. The A/V processing unit 240 merges the recorded audio and video to generate the A/V recording. The A/V processing unit 240 may store the A/V recording and also provide the A/V recording to components of the user interface 250, such as the display and speakers, to present the A/V recording to the user.

Figure 3:
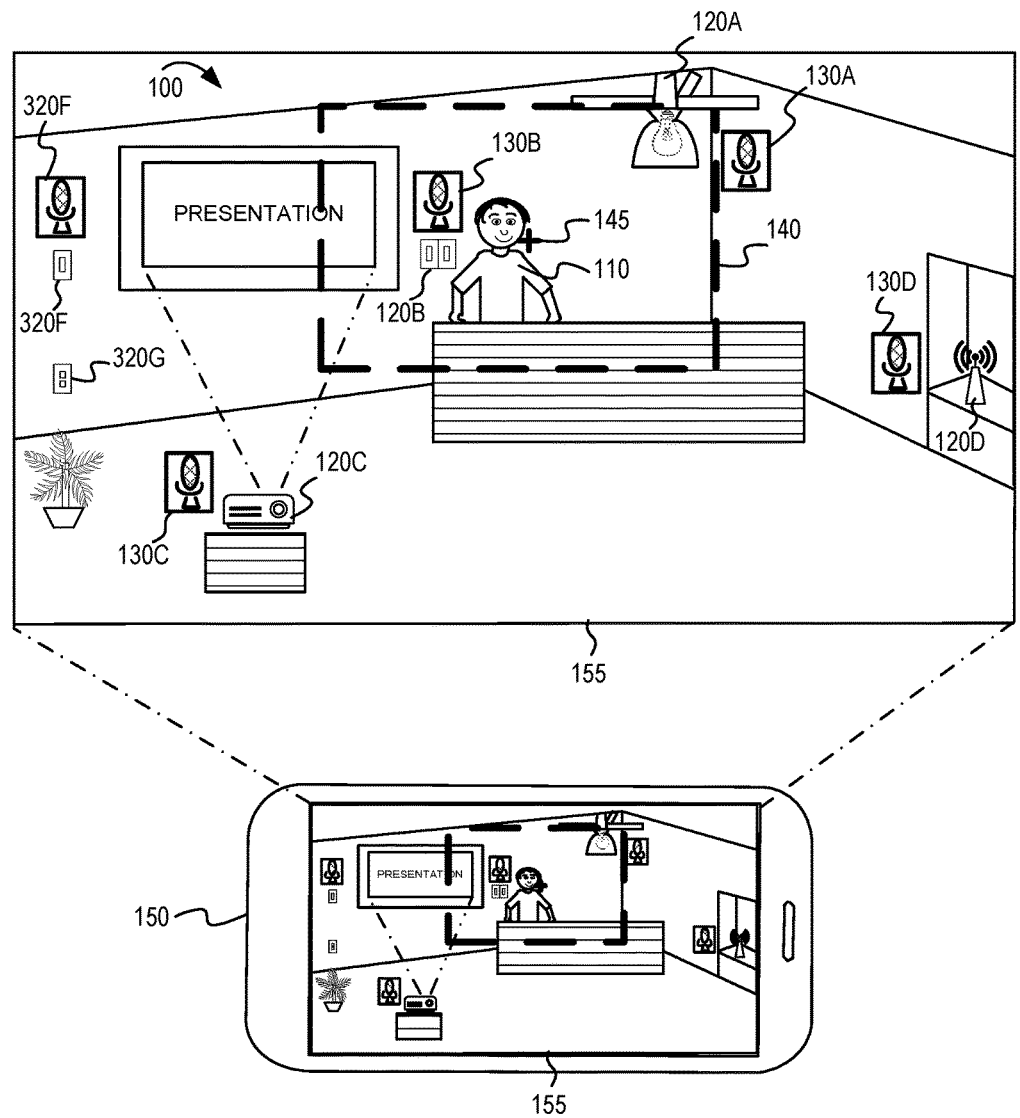
FIG. 3 shows another example diagram of the computing device displaying the IoT environment and switching from receiving an audio stream from a first IoT device to receiving an audio stream from a second IoT device after the field of view (FoV) of the camera of the computing device is changed.

As described in FIG. 3, during the A/V recording of the subject 110, when the FoV 155 of the camera changes, such as by the user moving the computing device 150 or the user zooming in or out, the computing device 150 can switch from receiving the audio stream from a first IoT device (such as IoT device 120A) to receiving the audio stream from a second IoT device (such as IoT device 120B).

FIG. 3 shows another example diagram of the computing device displaying the IoT environment and switching from receiving an audio stream from a first IoT device to receiving an audio stream from a second IoT device after the FoV of the camera of the computing device is changed. The diagram of FIG. 3 shows the same IoT environment 100 and the same subject 110 as the diagram of FIG. 1 (the presenter in the auditorium), except that the FoV 155 of the camera of the computing device 150 has been shifted to the left in FIG. 3 (from the perspective of the computing device 150) when the subject 110 moved to the left toward the presentation screen. For example, when the subject 110 moved left toward the presentation screen, the user moved the computing device 150 to the left in order to keep the subject 110 near the focal point 145 of the focus area 140 of the FoV 155. When the FoV 155 was shifted to the left, the IoT device 120E (a smart power plug shown in FIG. 1) is now outside the FoV 155 shown in FIG. 3, and IoT devices 320F and 320G are now displayed within the FoV 155 shown in FIG. 3. The IoT device 320F may be another smart light switch, and the IoT device 320G may be another smart power plug.

The FoV 155 of the camera of the computing device 150 is changed when the user moves the computing device 150 in any direction, such as left, right, up, down, forward, backward, or some combination of the directions. The FoV 155 of the camera also can be changed when the user zooms in or zooms out by using the zoom feature that is available in most cameras. Cameras may have various other features that can change at least one of the FoV 155, the focus area 140, and the focal point 145. For example, in some cameras, the user can move the focus area 140 and the focal point 145 to different areas within the FoV 155.

In FIG. 1, the computing device 150 may initially select the IoT device 120A to remotely record and stream audio for the A/V recording of the subject 110. In some implementations, when the FoV 155 of the camera changes, the computing device 150 may switch from receiving an audio stream from first IoT device (such as the IoT device 120A) to receiving an audio stream from a second IoT device. For example, the computing device 150 may determine which of the IoT devices 120 is closest to the focal point 145 (which may correspond to the location of the subject 110) when the FoV 155 of the camera changes, and then switch to receiving the audio stream from the second IoT device if the second IoT device is closer to the focal point 145 than the first IoT device. In the example shown in FIG. 1, when the subject 110 moved to the left and the user shifted the FoV 155 of the camera by moving the computing device 150 to the left, the focal point 145 of the FoV 155 shifted closer to the IoT device 120B than to the IoT device 120A. Thus, when the computing device 150 detects a change in the FoV 155, the computing device 150 may determine the distance between each of the IoT devices 120 and the focal point 145. In this example, the computing device 150 determines that the IoT device 120B is now closer to the focal point 145 than the IoT device 120A. The computing device 150 then automatically and seamlessly switches to receiving the audio stream from the IoT device 120B, as will be further described with reference to FIG. 5. Also, while receiving the audio stream from one of the IoT devices 120 and while switching from one IoT device to another IoT device, the computing device 150 may designate the local microphone of the computing device 150 as the backup microphone in case there are technical issues with the communication link or in case there are issues with the switch from one IoT device to another IoT device.

Figure 4:
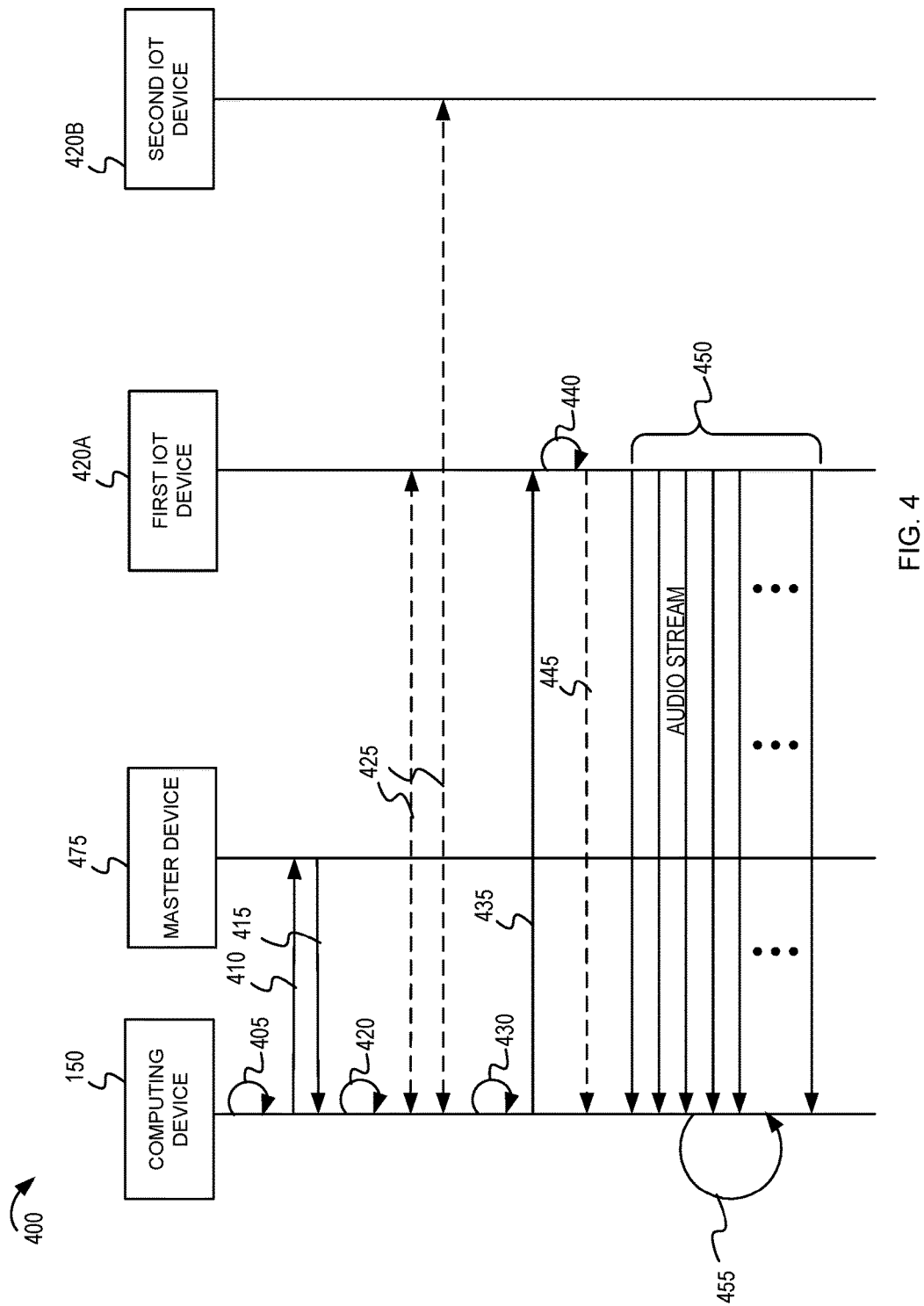
FIG. 4 shows an example message flow diagram of a computing device selecting one of the IoT devices for remotely recording and streaming audio during the A/V recording of the subject.

FIG. 4 shows an example message flow diagram of a computing device selecting one of the IoT devices for remotely recording and streaming audio during the A/V recording of the subject. The message flow diagram 400 includes messages between the computing device 150, a master device 475, a first IoT device 420A, and a second IoT device 420B. It is noted that the master device 475, the first IoT device 420A, and the second IoT device 420B may correspond to the IoT device 120D, the IoT device 120A, and the IoT device 120B of FIG. 1, respectively. However, the master device 475, the first IoT device 420A, and the second IoT device 420B also may be different devices in the IoT environment 100 or may be devices in a different IoT environment not shown.

At 405, the computing device 150 starts the camera application in response to receiving input from the user. The FoV 155 of the camera displays the IoT environment and the subject that will be recorded. At 410, the computing device 150 sends a request message to the master device 475 of the local network to request a map of the IoT devices of the IoT environment. The request message also may request additional information regarding the IoT devices, such as at least one of the type of IoT device, the operational capabilities of each IoT device, and the specifications of each IoT device. The master device 475 may either store the map of the IoT devices (and the other information about the IoT devices) locally or in a remote database accessed via the local network or the Internet. At 415, the master device 475 sends a response message to the computing device 150 that includes the map of the IoT devices. The map shows the location of the IoT devices within the IoT environment, including the location of the first IoT device 420A and of the second IoT device 420B. The response message also may include the additional information regarding the IoT devices that was requested by the computing device 150. If the master device 475 does not have additional information regarding the IoT devices, the master device 475 only sends the map of the IoT devices to the computing device 150. If the master device 475 does not have a map of the IoT devices, the request message may indicate that the master device does not have map of the IoT devices.

At 420, the computing device 150 merges the map of the IoT devices with the camera's FoV 155 to determine the location of the IoT devices. When the computing device 150 receives the requested information regarding the IoT devices (such as the type of IoT device, the operational capabilities of each IoT device, or the specifications of each IoT device) from the master device 475, the computing device 150 can determine that the first IoT device 420A and the second IoT device 420B have microphones and support remotely recording and streaming audio. When the computing device 150 merges the map of the IoT devices with the camera's FoV 155, the computing device 150 adds a visual indication (such as an icon) to the FoV 155 showing the location of the first IoT device 420A and the second IoT device 420B within the IoT environment and indicating that the first IoT device 420A and the second IoT device 420B support remote recording and streaming of audio. If the master device 475 does not provide the requested information regarding the IoT devices, at 425, the computing device 150 optionally sends a request message to both the first IoT device 420A and the second IoT device 420B requesting this information. The first IoT device 420A and the second IoT device 420B receive the request message and send back a response message that includes the requested information. The operational capabilities and specifications of each IoT device also may include the characteristics and specifications of each device's microphone. The request messages that are sent directly to each IoT device are optional because in some cases the master device 475 may have already provided the requested information.

At 430, the computing device 150 selects either the first IoT device 420A or the second IoT device 420B to remotely record and stream audio for the A/V recording of the subject. In some implementations, the computing device 150 may select the IoT device that is closest to the focal point 145 of the FoV 155 of the camera (which typically corresponds to the location of the subject being recorded). In the example of FIG. 4, the computing device 150 determines the distance between the first IoT device 420A and the focal point 145 of the FoV 155, and also determines the distances between the second IoT device 420B and the focal point 145 of the FoV 155. In some implementations, the computing device 150 may perform some measurements using a grid, and designate the focal point 145 of the FoV 155 as the origin in the X, Y axis. Thus, the focal point has the X, Y coordinates of (0, 0). The computing device 150 may determine that the first IoT device 420A has X, Y coordinates of (4, 9), and the second IoT device 420B has X, Y coordinates of (−15, 0). Thus, in this example, the first IoT device 420A is closer to the focal point than the second IoT device 420B. If the computing device 150 determines that the first IoT device 420A is closer to the focal point than the second IoT device 402B, the computing device 150 select the first IoT device 420A to remotely record and stream the audio for the A/V recording. In some implementations, the computing device 150 selects the IoT device that has a preferred microphone type and performance characteristics (or specifications). For example, the computing device 150 may use Table 1 to determine whether one of the IoT devices has a preferred microphone type with the best performance characteristics. For illustration purposes, Table 1 lists three different microphone types (Ribbon, Dynamic, and Condenser) and also the ratings (and the corresponding value assigned to each rating) that were determined for the output, ruggedness, sound quality, and throw associated with the microphones.

TABLE 1

Comparison of Different Microphone Types

| Microphone Type | Output | Ruggedness | Sound Quality | Throw |
|---|---|---|---|---|
| Ribbon | Worst (+1) | Worst (+1) | Best (+3) | $2^{nd}$ Best (+2) |
| Dynamic | $2^{nd}$ Best (+2) | Best (+3) | Worst (+1) | Best (+3) |
| Condenser | Best (+3) | $2^{nd}$ Best (+2) | $2^{nd}$ Best (+2) | Worst (+1) |

Based on the values assigned to each rating, and the average of the values associated with each microphone type, the computing device 150 may determine that the Dynamic microphone type is the preferred microphone type. If the computing device 150 determines that the first IoT device 420A has the Dynamic microphone type and the second IoT device 420B has the Ribbon microphone type, the computing device 150 may select the first IoT device 420A. If both the first IoT device 420A and the second IoT device 420B have the same microphone type (such as the Dynamic microphone type), the computing device 150 may compare additional performance characteristics and specifications of the microphones to determine which IoT device to select for the A/V recording. For example, the computing device 150 may compare the sensitivity, overload, distortion, noise, and other parameters associated with the microphones to determine which IoT device to select. If the computing device 150 determines that the microphones are of the same quality, the computing device 150 can select the IoT device that is closest to the focal point 145 of the FoV 155.

In some implementations, the computing device 150 may receive an audio stream from each of the first IoT device 420A and the second IoT device 420B, and the computing device 150 may process the audio streams to select the IoT device that streamed the best quality audio. For example, the first IoT device 420A and the second IoT device 420B may each send an audio stream to the computing device 150 in response to receiving, at 425, the request message from the computing device 150. In another example, the computing device 150 may establish a communication link with each of the first IoT device 420A and the second IoT device 420B when the computing device 150 communicates with the master device, at 410. The first IoT device 420A and the second IoT device 420B may begin streaming the audio after the communication link is established between the IoT devices and the computing device 150. After receiving the audio streams, the computing device 150 may sample each audio stream and process the samples from each audio stream to determine the best quality audio stream. For example, the computing device may compare various audio quality characteristics, such as the sound quality, distortion, noise, and other characteristics or parameters to determine the best quality audio stream. The computing device 150 may select the first IoT device 420A based on the audio quality characteristics of the audio stream received from the first IoT device 420A.

At 435, the computing device 150 sends a message to the first IoT device 420A with a command to begin recording audio and streaming the audio to the computing device 150. At 440, the first IoT device 420A processes the command received from the computing device 150 and, at 445, optionally sends back an acknowledgement message. At 450, the first IoT device 420A begins recording and streaming the audio to the computing device 150. At 455, the computing device 150 receives the audio stream from the first IoT device 420A and merges the audio with the recorded video to generate the A/V recording of the subject.

Figure 5:
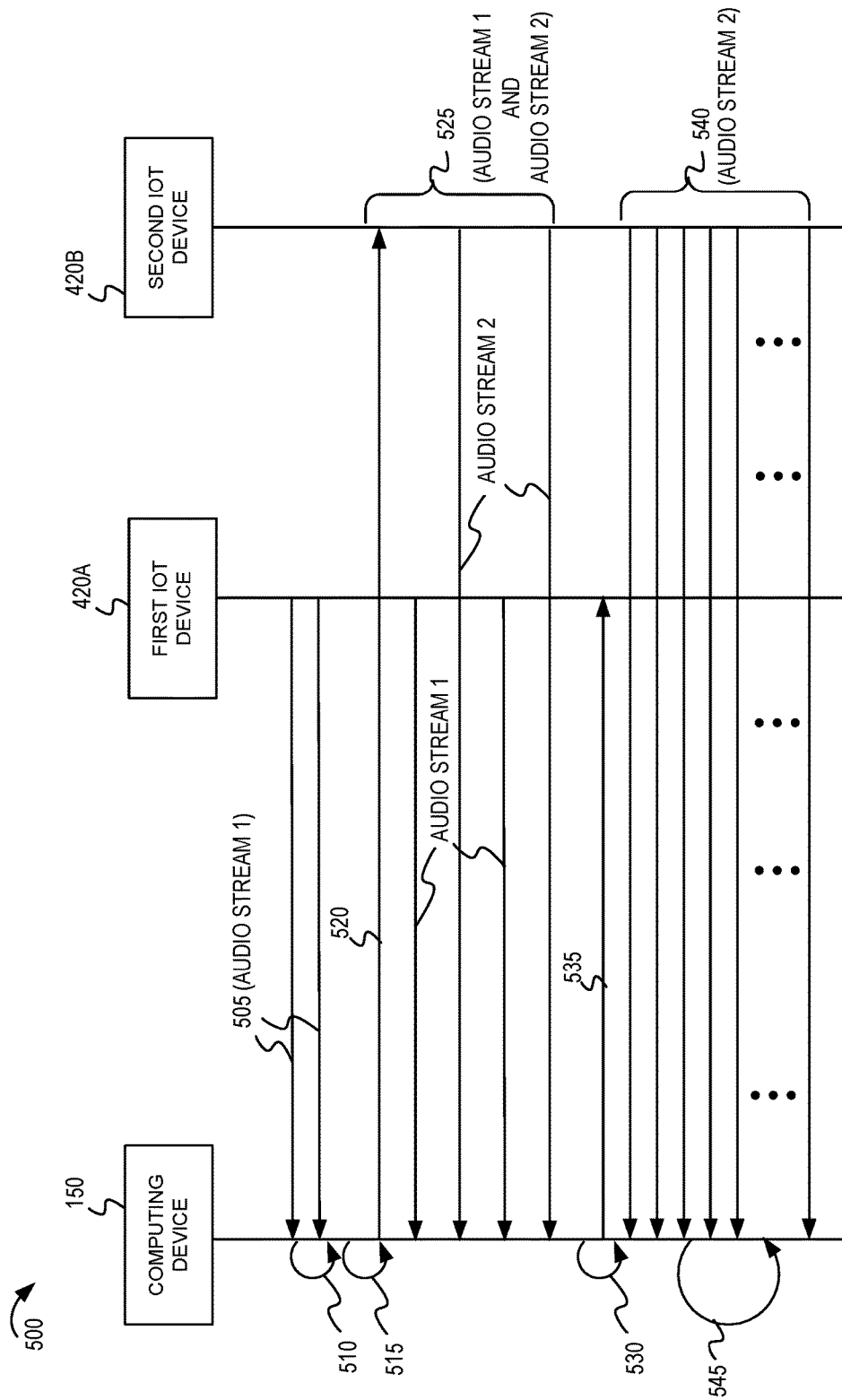
FIG. 5 shows an example message flow diagram of a computing device switching from receiving an audio stream from a first IoT device to receiving an audio stream from a second IoT device after the FoV of the camera of the computing device is changed.

FIG. 5 shows an example message flow diagram of a computing device switching from receiving an audio stream from a first IoT device to receiving an audio stream from a second IoT device after the FoV of the camera of the computing device is changed. Similar to FIG. 4, the message flow diagram 500 of FIG. 5 includes messages between the computing device 150, the first IoT device 420A, and the second IoT device 420B.

At 505, the first IoT device 420A continues to record and stream the audio for the computing device 150, as described in FIG. 4. In FIG. 5, the audio stream that is received by the computing device 150 from the first IoT device 420A may be referred to as Audio Stream 1. At 510, the computing device 150 continues to process the Audio Stream 1, and at the same time monitors the FoV 155 of the camera of the computing device 150. At 515, the computing device 150 determines that the FoV 155 of the camera of the computing device 150 has changed. For example, the computing device 150 may determine that the user moved the computing device 150, or that the user zoomed in or out using the zoom camera features. When the computing device 150 detects that the FoV of the camera has changed, the computing device 150 may determine to change from receiving the Audio Stream 1 from the first IoT device 420A to receiving an audio stream (such as Audio Stream 2) from the second IoT device 420B. The computing device 150 may determine to switch to receiving the audio stream from a different IoT device for various reasons, such as determining that the second IoT device 420B is now closer to the focal point of the FoV than the first IoT device 420A after the FoV of the camera changed. At 520, the computing device 150 sends a message to the second IoT device 420B with a command to begin remotely recording audio and streaming the audio to the computing device 150.

In some implementations, the computing device 150 may coordinate the sending of commands to the IoT devices to start and stop the recording and streaming of audio in order to seamlessly switch from receiving the Audio Stream 1 from the first IoT device 420A to receiving the Audio Stream 2 from the second IoT device 420B. For example, when the computing device 150, the first IoT device 420A, and the second IoT device 420B communicate using protocols from the IEEE 802.11 standards (such as 802.11 b/g/n/ac/ax), the computing device 150 may send a command to the second IoT device 420B to begin remotely recording and streaming the audio, while still receiving the Audio Stream 1 from the first IoT device 420A. In other words, since the IEEE 802.11 standards and the corresponding devices support receiving multiple streams in multiple sessions, the computing device 150 can receive both the Audio Stream 1 and the Audio Stream 2 for a period of time to seamlessly switch from the first IoT device 420A to the second IoT device 420B. In some implementations, during the period of time when the computing device 150 receives both the Audio Stream 1 and the Audio Stream 2, the computing device 150 may optionally send a message to the first IoT device 420A to request that the first IoT device 420A begin to gradually decrease the amplitude or volume of the audio until the first IoT device 420A stops streaming the audio.

At 525, the computing device 150 begins receiving both the Audio Stream 1 from the first IoT device 420A and the Audio Stream 2 from the second IoT device 420B for a period of time. At 530, the computing device 150 processes both the Audio Stream 1 and the Audio Stream 2 and seamlessly mixes the two audio streams with little or no glitches or audio loss. While the computing device 150 continues to process both audio streams, at 535, the computing device 150 sends a message to the first IoT device 420A with a command to stop recording and streaming the audio. At 540, the second IoT device 420B continues to send the Audio Stream 2 and, at 545, the computing device 150 begins to receive and process only the Audio Stream 2 from the second IoT device 420B.

Since the Bluetooth standards and the corresponding devices do not support receiving multiple streams in multiple sessions, when the computing device 150, the first IoT device 420A, and the second IoT device 420B communicate using Bluetooth protocols, the computing device 150 cannot receive both the Audio Stream 1 and the Audio Stream 2 at the same time. Instead, in some implementations, the computing device 150 may send a message to the first IoT device 420A with a command to gradually decrease the amplitude or volume of the audio when the computing device 150 is preparing to switch to the second IoT device 420B. When the computing device 150 detects the communication from the second IoT device 420B, the computing device 150 sends a message to the first IoT device 420A with a command to stop sending the Audio Stream 1, and begins receiving the Audio Stream 2 from the second IoT device 420B.

In some implementations, the computing device 150 may implement a hysteresis timer that can prevent the computing device 150 from switching between IoT devices too frequently. In some implementations, the hysteresis timer can be preconfigured with a hysteresis time period and also can be user configurable. The preconfigured hysteresis time period may be any suitable time period, such as 50, 75, 100 milliseconds, and the user can change the configuration to any of the suitable time periods. In one example, when the computing device 150 determines, at 515, that the FoV 155 of the camera of the computing device 150 has changed, the computing device 150 starts the hysteresis timer. If the hysteresis time period expires without the computing device 150 detecting an additional change in the FoV 155 of the camera, the computing device 150 proceeds to determine whether to switch between IoT devices. However, if an additional change in the FoV 155 is detected before the hysteresis time period expires, the computing device 150 restarts the hysteresis time period and does not begin the process for switching between the IoT devices.

Figure 6:
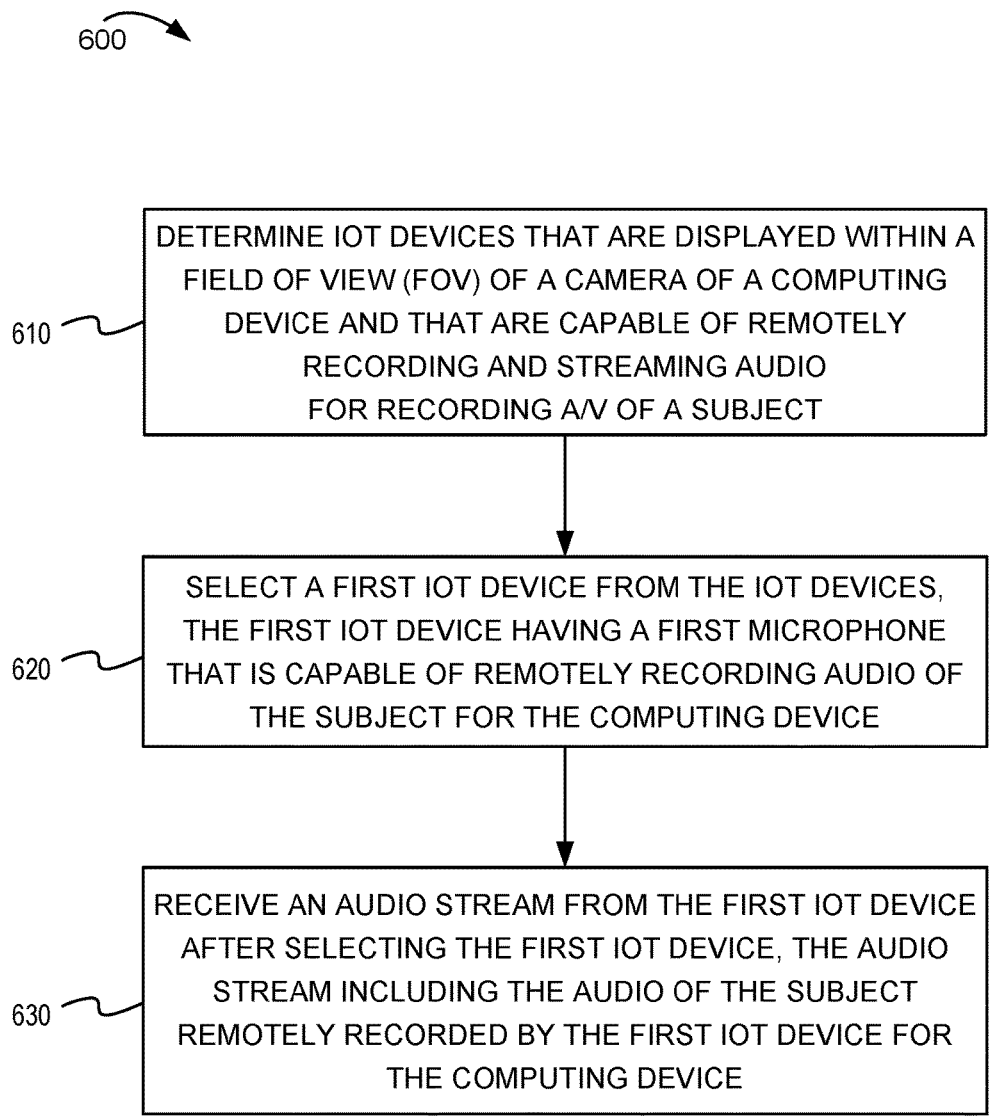
FIG. 6 shows an example flowchart for determining and selecting an IoT device for remotely recording and streaming audio during the A/V recording of the subject.

FIG. 6 shows an example flowchart for determining and selecting an IoT device for remotely recording and streaming audio during the A/V recording of the subject. The flowchart 600 begins at block 610.

At block 610, the computing device 150 determines IoT devices that are displayed within the FoV 155 of the camera of the computing device 150 and that are capable of remotely recording and streaming audio for recording A/V of a subject. For example, the computing device 150 obtains a map of the locations of the IoT devices from a master device of a local network. The computing device 150 may determine that the IoT devices each have a microphone and are capable of remote audio recording and audio streaming from information obtained from the master device or from information obtained from each of the IoT devices. The computing device 150 may display visual indicators within the FoV 155 of the camera for each of the IoT devices that are capable of remote audio recording and audio streaming. The visual indicators also indicate the location of each of the IoT devices within the FoV 155 of the camera.

At block 620, the computing device 150 selects a first IoT device from the IoT devices that are displayed in the FoV 155. The first IoT device includes a microphone that is capable of remotely recording audio of the subject for the A/V recording and supports streaming of the audio to the computing device 150. For example, the computing device 150 may determine, within the FoV 155 of the camera of the computing device 150, distance measurements from each of the IoT devices to the focal point 145 of the FoV 155. The computing device 150 may select a first IoT device from the IoT devices based, at least in part, on the distance measurements. For example, the computing device 150 may determine that the first IoT device is located the closest to the focal point 145 of the FoV 155 compared to the rest of the IoT devices, and therefore may select the first IoT device to remotely record and stream the audio of the subject. In another example, the computing device 150 may determine and compare microphone types and performance characteristics associated with each microphone of the IoT devices. The computing device 150 may select the first IoT device after determining the first IoT device has a preferred microphone type and performance characteristics, as described in FIG. 4. In another example, the computing device 150 may select the first IoT device based on both the distance measurements and the microphone type and performance characteristics. Also, in another example, the computing device 150 may select the first IoT device based on input received from the user.

At block 630, the computing device 150 receives an audio stream from the first IoT device after the computing device 150 selects the first IoT device. The received audio stream includes audio of the subject that is remotely recorded by the first IoT device. The computing device 150 also records video of the subject using the camera of the computing device 150. The computing device 150 generates the A/V recording of the subject using the video recorded by the camera of the computing device 150 and the audio remotely recorded by the first IoT device.

Figure 7:
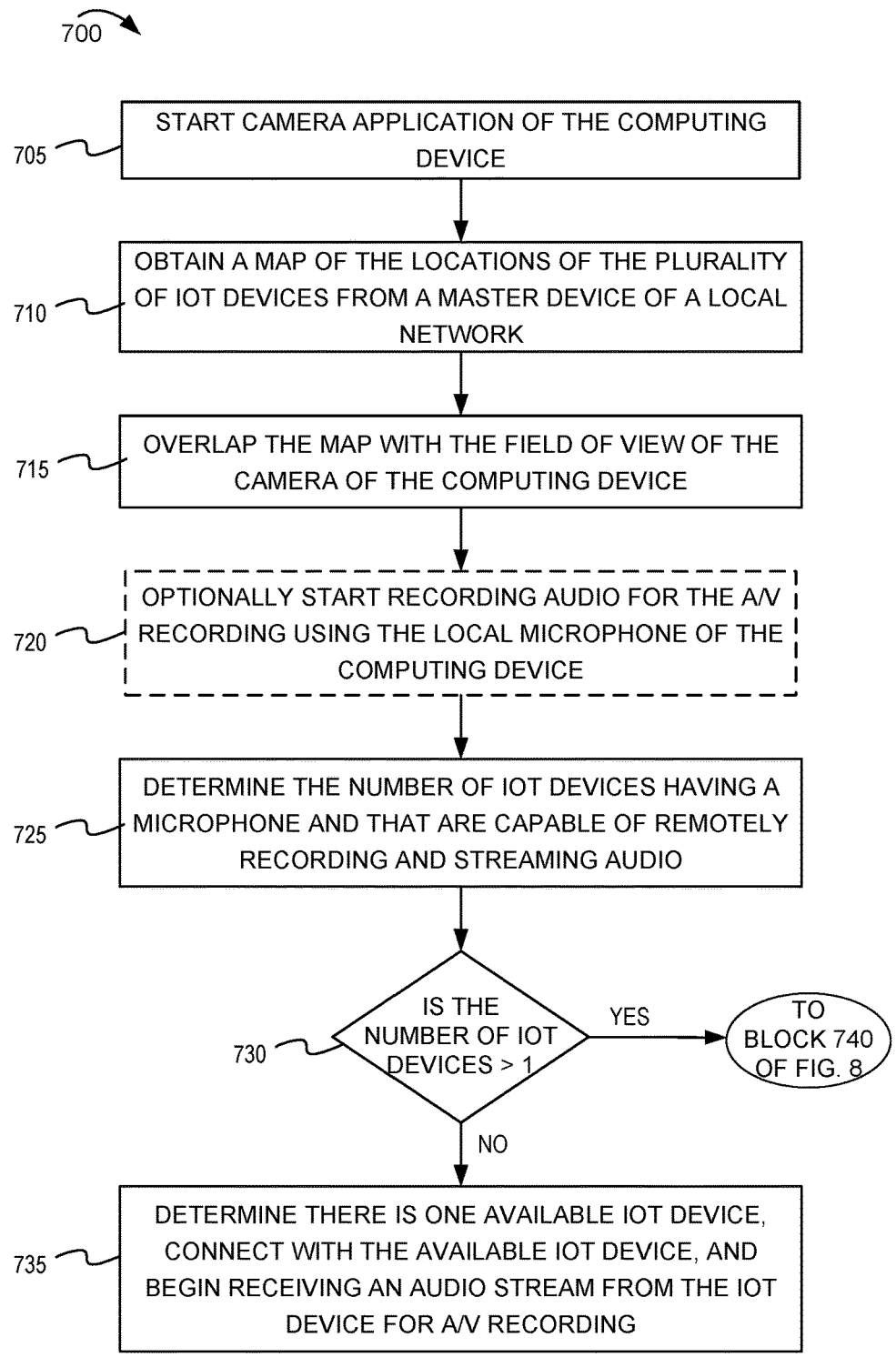
FIG. 7 shows an example flowchart for identifying and selecting an IoT device that is capable of remotely recording and streaming audio during the A/V recording of the subject.

FIG. 7 shows an example flowchart for identifying and selecting an IoT device that is capable of remotely recording and streaming audio during the A/V recording of the subject. The flowchart 700 begins at block 705.

At block 705, the computing device 150 starts a camera application. For example, the computing device 150 starts the camera application in response to receiving user input.

At block 710, the computing device 150 obtains a map of the locations of the IoT devices in the IoT environment from a master device of a local network.

At block 715, the computing device 150 overlaps (or merges) the map with the FoV 155 of the camera of the computing device 150.

At block 720, the computing device 150 optionally starts to record audio for the A/V recording using the local microphone of the computing device 150. In some implementations, if the user starts the A/V recording before the computing device 150 has time to select one of the remote IoT devices, the camera of the computing device 150 initially starts recoding the audio using the local microphone of the computing device 150. After the computing device 150 selects one of the IoT devices, the computing device 150 seamlessly switches to using the audio that is streamed by the selected IoT device for the A/V recording. In some implementations, the computing device 150 may have enough time to select the IoT device before the user starts the A/V recording. Thus, in some cases, the computing device 150 may begin the A/V recording using the audio that is streamed from the selected IoT device without initially using the local microphone of the computing device 150.

At block 725, the computing device 150 determines the number of IoT devices that have a microphone and that are capable of remotely recording and streaming audio. The computing device 150 may determine the number of IoT devices that have a microphone and that are capable of remotely recording and streaming audio from information obtained from the master device or from information obtained from each of the IoT devices. In some implementations, the computing device 150 displays a visual indication within the FoV 155 of the camera of the computing device 150 that indicates the location of the IoT devices that have a microphone and that are capable of remotely recording and streaming audio.

Figure 8:
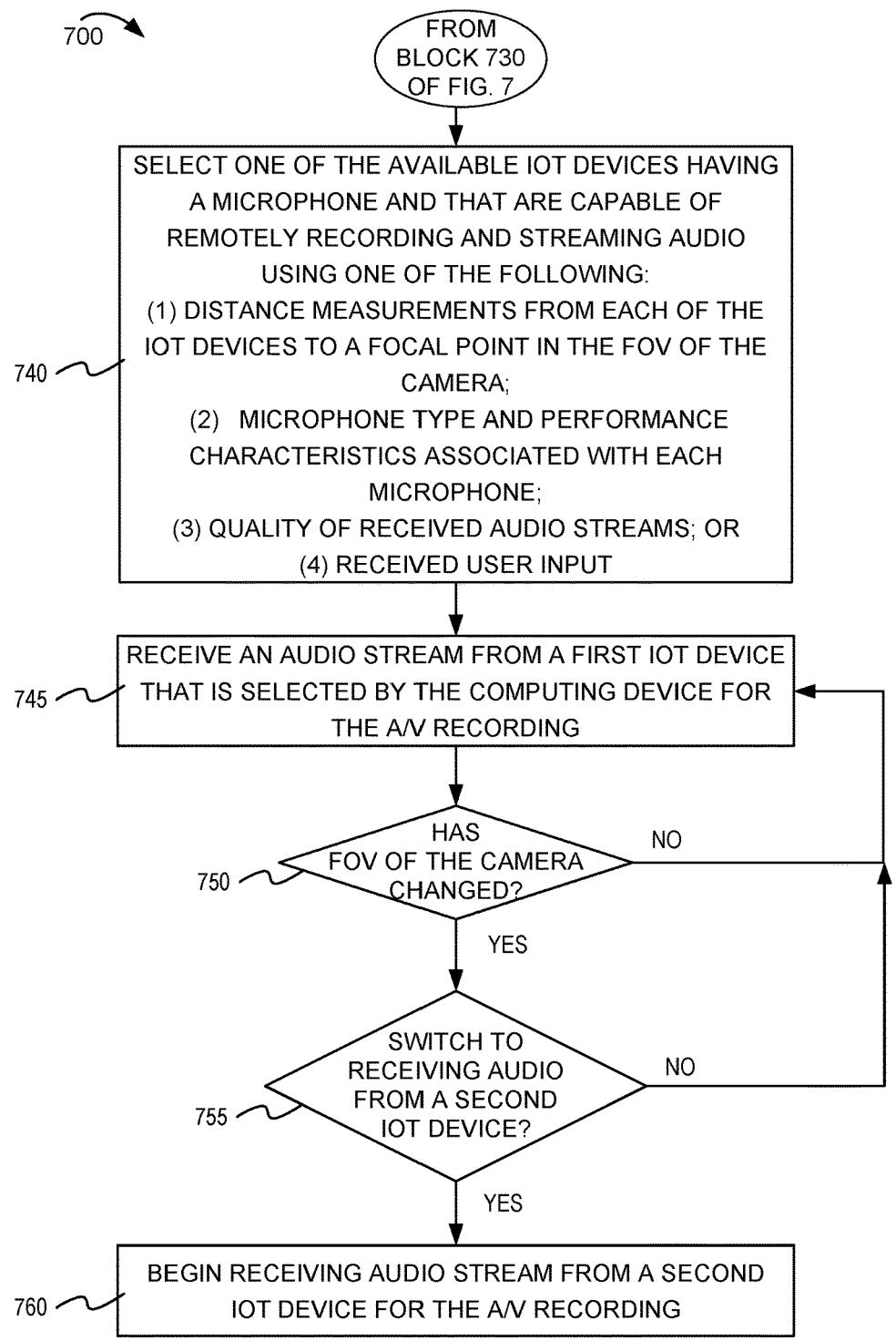
FIG. 8 is a continuation of the example flowchart of FIG. 7 for identifying and selecting IoT devices that are capable of remotely recording and streaming audio during the A/V recording of the subject.

At block 730, if the computing device 150 determines that the number of IoT devices that have a microphone and that are capable of remotely recording and streaming audio is greater than one, then the flow continues at block 740 of FIG. 8. Otherwise, if the computing device 150 determines that there is only one IoT device that has a microphone and that is capable of remotely recording and streaming audio, then the flow continues at block 735.

At block 735, the computing device 150 determines there is one available IoT device, selects and connects with the available IoT device, and begins receiving an audio stream from the IoT device for the A/V recording. If the computing device 150 initially started recording audio using the local microphone (at optional block 720), then the computing device 150 switches from recording the audio using the local microphone to recording the audio using the microphone of the IoT device.

FIG. 8 is a continuation of the example flowchart of FIG. 7 for identifying and selecting IoT devices that are capable of remotely recording and streaming audio during the A/V recording of the subject. The flowchart 700 continues at block 740.

At block 740, the computing device 150 select one of the available IoT devices having a microphone and that are capable of remotely recording and streaming audio. The computing device 150 may select the IoT device based on distance measurements between the IoT devices and the focal point 145 of the FoV 155, based on the microphone types and performance characteristics associated with each of the microphones, based on the quality of the audio streams received from the IoT devices, or based on an input received from the user, as described in FIG. 4.

At block 745, the computing device 150 begins receiving an audio stream from a first IoT device that is selected by the computing device 150 for the A/V recording. If the computing device 150 initially started recording audio using the local microphone (at optional block 720), then the computing device 150 switches from recording the audio using the local microphone to recording the audio using the microphone of the first IoT device.

At block 750, the computing device 150 determines whether the FoV 155 of the camera of the computing device 150 has changed. If the FoV 155 of the camera has not changed, the flow returns to block 745 and the computing device 150 continues receiving the audio stream from the selected IoT device. If the FoV 155 of the camera has changed, the flow continues at block 755.

At block 755, the computing device 150 determines whether to switch to receiving an audio stream from a second IoT device. For example, if the computing device 150 is currently receiving an audio stream from the first IoT device, the computing device 150 determines whether to continue receiving the audio stream from the first IoT device or to switch to receiving an audio stream from a second IoT device. The computing device 150 may determine to switch to receiving the audio stream from the second IoT device if the second IoT device is closer to the focal point of the FoV 155 than the first IoT device after the change in the FoV 155 of the camera. If the computing device 150 determines not to switch to receiving audio from a second IoT device, the flow returns to block 745 and the computing device 150 continues receiving the audio stream from the first IoT device. If the computing device 150 determines to switch to receiving audio from the second IoT device, the flow continues at block 760.

At block 760, the computing device 150 begins to receive an audio stream from the second IoT device for the A/V recording. The computing device 150 may implement techniques to coordinate the change from the first IoT device to the second IoT device to seamlessly switch from receiving and processing the audio stream from the first IoT device to receiving and processing the audio stream from the second IoT device for the A/V recording.

In some implementations, the computing device 150 may select two or more remote IoT devices to remotely record and stream audio of the subject for the A/V recording. The computing device 150 may use the same techniques described for selecting one of the IoT devices to select two or more IoT devices. In one example, within the FoV 155 of the camera of the computing device 150, the computing device 150 may measure the distances from each of the IoT devices to the focal point 145 of the FoV 155, and use the distance measurements to select two or more of the IoT devices. For example, the computing device 150 may select the two IoT devices that are closest to the focal point 145 based on the distance measurements. In another example, the computing device 150 may select two or more of the IoT devices based on the microphone type and performance characteristics associated with each microphone of each of the IoT devices. For example, the computing device 150 may compare the microphone types and performance characteristics of all the microphones and may select the two IoT devices that have the preferred microphone types and performance characteristics. In another example, the computing device 150 may receive an audio stream from each of the IoT devices, and the computing device 150 may process the audio streams to select two or more of the IoT devices. For example, the computing device may select the two IoT devices that streamed the best quality audio. In another example, the computing device 150 also may consider the proximity of the IoT devices to each other when selecting two or more IoT devices. For example, if the computing device 150 determines there are multiple IoT devices within the focus area 140 of the FoV 155 of the camera, the computing device 150 may select the two IoT devices that are closest to one another. The computing device 150 may use distance measurements (similarly as described in FIG. 4) to determine the IoT devices that are closest to one another. Thus, in addition to being located in close proximity to the focal point 145 of the FoV, the selected IoT devices also may be in close proximity to each other. Furthermore, the computing device 150 may implement the same techniques described for switching between microphones when the FoV 155 of the camera changes. For example, when the FoV 155 of the camera changes, the computing device 150 may determine whether the two IoT devices are still the closest two IoT devices to the focal point 145 of the FoV 155. If not, the computing device 150 may switch one or both of the IoT devices with the corresponding number of IoT devices that are closer to the focal point 145 of the FoV 155.

In some implementations, when the devices communication using protocols from the IEEE 802.11 standards, the computing device 150 can implement a three-channel remote audio recording and audio streaming. In this implementation, the computing device 150 may receive an audio stream from three different microphones of three different IoT devices to improve noise cancellation and suppression. For example, the computing device 150 can select a primary microphone and two secondary microphones, with each microphone providing a separate audio stream to the computing device 150. In this example, the computing device 150 can receive the three audio streams, apply noise cancellation and suppression techniques, and combine and mix the three audio streams when generating the audio for the A/V recording. In one example, the primary microphone may be used to record the audio and at least one secondary microphone can be used for noise cancellation and suppression.

In some implementations, instead of the computing device 150 receiving the audio stream from one or more remote IoT devices, the master device of the local network may receive the one or more audio streams from the one or more remote IoT devices, process the audio streams, and provide the processed audio to the computing device 150. In one example, the computing device 150 sends a message to one or more remote IoT devices having microphones with a command to begin recording audio and to stream the audio to the master device. In another example, the computing device 150 provides the computing device's location and the FoV 155 of the computing device's camera to the master device, and the master device determines which IoT devices to enable to begin recording and streaming audio based on the computing device's location and the FoV 155 of the camera.

Figure 9:
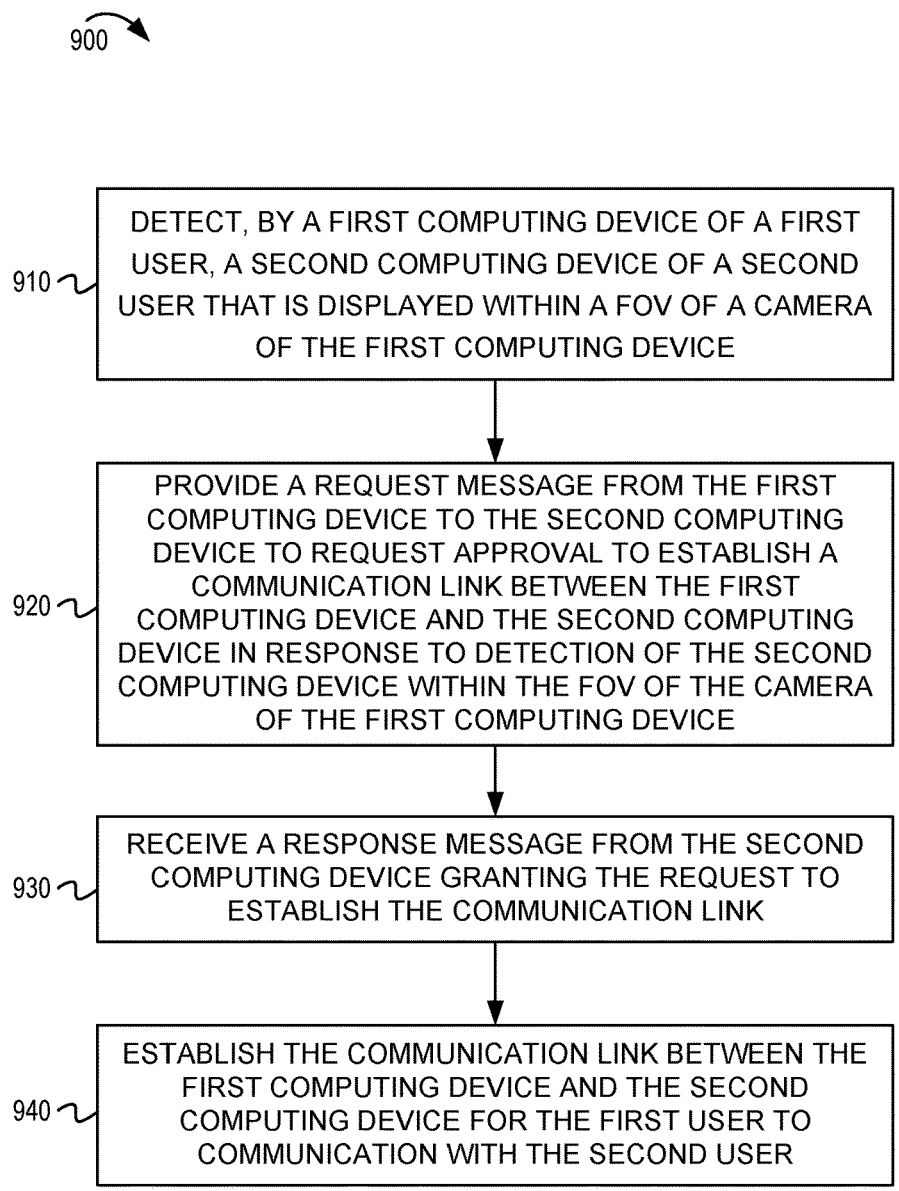
FIG. 9 shows an example flowchart for establishing a communication link between a first computing device of a first user and a second computing device of a second user after detecting the second computing device within a FoV of a camera of the first computing device.

FIG. 9 shows an example flowchart for establishing a communication link between a first computing device of a first user and a second computing device of a second user after detecting the second computing device within a FoV of a camera of the first computing device. The flowchart 900 begins at block 910.

At block 910, the first computing device of a first user detects a second computing device of a second user that is displayed within a FoV of a camera of the first computing device. In one example, if both the first computing device and the second computing device are pairs of smart glasses (or AR glasses), when the first user looks in the direction of the second user from a distance, the first user's smart glasses may detect the second user's smart glasses in the FoV of the camera of the first user's smart glasses. When the first user looks in the direction of the second user, the first user may position the second user wearing the smart glasses in the FoV of the camera of the first user's smart glasses, and then the first user may provide an input indicating the first user wants to communicate with the second user.

At block 920, the first computing device provides a request message to the second computing device to request approval to establish a communication link between the first computing device and the second computing device, in response to detection of the second computing device within the FoV of the camera of the first computing device. For example, the first user's smart glasses can send a request message to the second user's smart glasses to request approval to establish a communication link between the two devices. For example, the first user's smart glasses can send the request message using protocols in the IEEE 802.11 or Bluetooth standards.

At block 930, the first computing device receives a response message from the second computing device granting the request to establish the communication link. For example, the first user's smart glasses may receive a response message from the second user's smart glasses accepting the request to establish the communication link after the second user's smart glasses detects input from the second user indicating acceptance of the request. In another example, the first user's smart glasses may receive a response message denying the request to establish the communication link.

At block 940, the first computing device establishes the communication link between the first computing device and the second computing device for the first user to communication with the second user. For example, the first user's smart glasses and the second user's smart glasses exchange messages to establish a two-way communication link. After the communication link is established, the first user can communication with the second user by speaking into the microphone of the first user's smart glasses and the second user will hear the first user via the speakers of the second user's smart glasses, and vice versa.

In some implementations, after the communication link between the first computing device and the second computing device is established, either the first user or the second user can try to establish a communication link with a third computing device of a third user in order to start a conference call between the three users. For example, the first user can look in the direction of the third user and position the third user wearing the smart glasses in the FoV of the camera of the first user's smart glasses. Then, the first user may provide an input indicating the first user wants to communicate with the second user and the first computing device may send a request message to the third user. Similar to the process described with respect to the second user, the third user can grant or deny the request to establish a communication link.

In some implementations, if the first user is wearing smart glasses but the second user does not have smart glasses, the first user can place the second user's mobile phone or another IoT device close to the second user in the FoV of the camera of the smart glasses to try to establish a communication link. If the IoT device only has a microphone, then the first user's smart glasses can connect with the microphone of the IoT device. For example, a speaker in an auditorium wearing smart glasses can connect to an IoT device having a microphone that is close to an audience member that is asking a question, so that the speaker can hear the audience member's question via the microphone. In another example, a first user wearing smart glasses can communicate from a distance with a second user having a mobile phone if the second user accepts the communication request via the mobile phone.

In some implementations, the first user wearing smart glasses can place a product at a location (such as a showroom, trade show, or store) in the FoV of the camera of the smart glasses to dynamically obtain product information from a distance. For example, when the first user looks in the direction of the product and places the product in the FoV of the camera of the smart glasses, the smart glasses can establish a communication link with the product and dynamically obtain product information (either directly from the product or from a master device). For example, after establishing the communication link with the product, the user can send voice commands to the product via the communication link requesting the product information. Also, the first user can obtain product information from many products from a distance by establishing communication links with the different products from a distance and requesting the information using voice commands.

Figure 10:
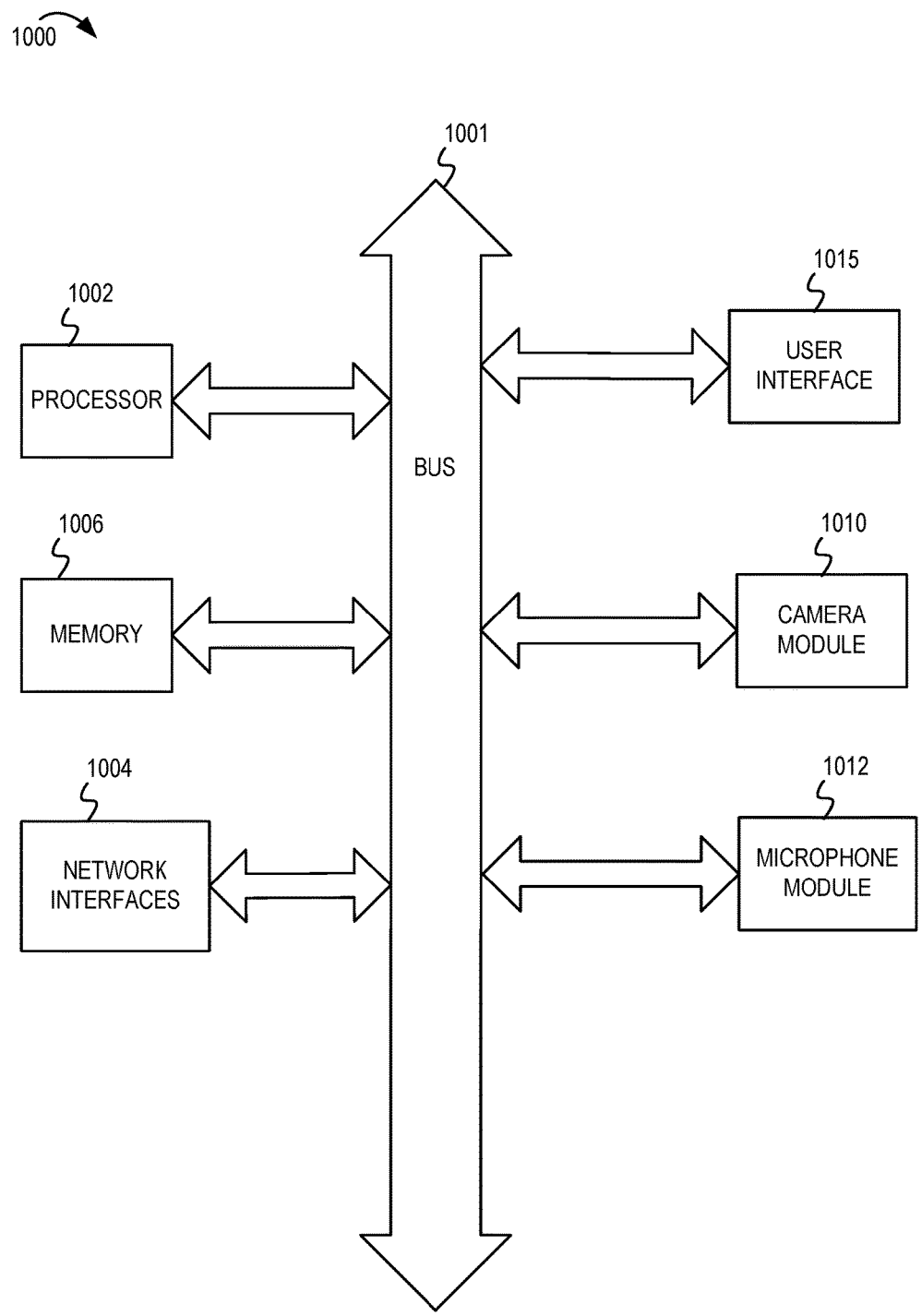
FIG. 10 shows a block diagram of an example electronic device for implementing aspects of this disclosure.

FIG. 10 shows a block diagram of an example electronic device 1000 for implementing aspects of this disclosure. In some implementations, the electronic device 1000 may be similar to the computing device 150. The electronic device 1000 may be a laptop computer, a tablet computer, a mobile phone, a gaming console, a smartwatch, virtual or augmented reality device (such as a pair of smart glasses), a drone, or another electronic system. The electronic device 1000 includes a processor 1002 (possibly including multiple processors, multiple cores, multiple nodes, or implementing multi-threading, etc.). The electronic device 1000 includes a memory 1006. The memory 1006 may be system memory or any one or more of the below-described possible realizations of a machine-readable medium or computer-readable medium. The electronic device 1000 also may include a bus 1001 (such as PCI, ISA, PCI-Express, HyperTransport®, InfiniBand®, NuBus, AHB, AXI, etc.). The electronic device may include one or more network interfaces 1004, which may be a wireless network interface (such as a WLAN interface, a Bluetooth® interface, a WiMAX interface, a ZigBee® interface, a Wireless USB interface, etc.) or a wired network interface (such as a powerline communication interface, an Ethernet interface, etc.). In some implementations, electronic device 1000 may support multiple network interfaces 1004, each of which may be configured to couple the electronic device 1000 to a different communication network.

The memory 1006 includes functionality to support various implementations. The memory 1006 may include one or more functionalities that facilitate implementation of identifying and selecting one or more IoT devices for remotely recording and streaming audio during an A/V recording. For example, memory 1006 can implement one or more aspects of the computing device 150. The memory 1006 can embody functionality to enable implementations described in FIGS. 1-9. The electronic device 1000 also may include additional components, such as a camera module 1010, a microphone module 1012, a user interface 1015, and other input/output component.

Any one of these functionalities may be partially (or entirely) implemented in hardware, such as on the processor 1002. For example, the functionality may be implemented with an application specific integrated circuit, in logic implemented in the processor 1002, in a co-processor on a peripheral device or card, etc. Further, realizations may include fewer or additional components not illustrated in FIG. 10 (such as video cards, audio cards, additional network interfaces, peripheral devices, etc.). The processor 1002 and the memory 1006 may be coupled to the bus 1001. Although illustrated as being coupled to the bus 1001, the memory 1006 may be directly coupled to the processor 1002.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include cache memory, RAM (including SRAM, DRAM, zero capacitor RAM, Twin Transistor RAM, eDRAM, EDO RAM, DDR RAM, EEPROM, NRAM, RRAM, SONOS, PRAM, or the like), ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for network communication performed by a computing device for recording audio and video (A/V), comprising:
   determining, by the computing device, a plurality of internet of things (IoT) devices that are displayed within a field of view (FoV) of a camera of the computing device and that are capable of remote audio recording and audio streaming;
   determining, within the FoV of the camera of the computing device, distance measurements from each of the plurality of IoT devices displayed within the FoV to a focal point of the FoV;
   selecting, by the computing device, a first IoT device from the plurality of IoT devices based, at least in part, on the distance measurements, the first IoT device having a first microphone that is capable of remotely recording audio of a subject for the computing device; and
   receiving, by the computing device, an audio stream from the first IoT device after selecting the first IoT device, the audio stream including the audio of the subject remotely recorded by the first IoT device for the computing device.

2. The method of claim 1, wherein selecting the first IoT device from the plurality of IoT devices based, at least in part, on the distance measurements comprises:
   determining, based on the distance measurements, that the first IoT device from the plurality of IoT devices is located closest to the focal point of the FoV; and
   selecting the first IoT device from the plurality of IoT devices based, at least in part, on determining that the first IoT device is located closest to the focal point of the FoV.

3. The method of claim 1, further comprising:
   determining a microphone type and performance characteristics associated with each microphone of each of the plurality of IoT devices; and
   comparing the microphone type and performance characteristics associated with each microphone of each of the plurality of IoT devices,
   wherein selecting the first IoT device from the plurality of IoT devices is further based, at least in part, on the microphone type and performance characteristics associated with the first microphone of the first IoT device.

4. The method of claim 1, further comprising:
   determining that the first IoT device and a second IoT device of the plurality of IoT devices are displayed within the focal area of the FoV of the camera of the computing device;
   receiving a first audio stream from the first IoT device and a second audio stream from the second IoT device; and
   comparing audio quality characteristics of the first audio stream to audio quality characteristics of the second audio stream,
   wherein selecting the first IoT device is further based, at least in part, on the audio quality characteristics of the first audio stream received from the first IoT device.

5. The method of claim 1, further comprising:
   receiving, by the computing device, user input selecting the first IoT device having the first microphone,
   wherein selecting the first IoT device from the plurality of IoT devices is further based, at least in part, on the user input.

6. The method of claim 1, further comprising:
receiving, by the computing device, user input selecting a second IoT device from the plurality of IoT devices, the second IoT device having a second microphone that is capable of remotely recording the audio of the subject;
overriding a selection of the first IoT device by the computing device based, at least in part, on receiving the user input selecting the second IoT device; and
selecting the second IoT device from the plurality of IoT devices based, at least in part, on the user input.

7. The method of claim 1, further comprising:
recording video of the subject using the camera of the computing device; and
generating an A/V recording of the subject using the video of the subject recorded by the camera of the computing device and the audio of the subject remotely recorded by the first microphone of the first IoT device.

8. The method of claim 1, further comprising:
detecting a change in the FoV of the camera of the computing device; and
determining to switch from receiving the audio stream from the first IoT device to receiving an audio stream from a second IoT device after detecting the change in the FoV of the camera, the second IoT device having a second microphone that is capable of remotely recording the audio of the subject.

9. The method of claim 8, wherein determining to switch from receiving the audio stream from the first IoT device to receiving the audio stream from the second IoT device after detecting the change in the FoV of the camera comprises:
determining that the second IoT device is located closer to the focal point of the FoV than the first IoT device after detecting the change in the FoV of the camera; and
determining to switch from receiving the audio stream from the first IoT device to receiving the audio stream from the second IoT device in response to determining that the second IoT device is located closer to the focal point of the FoV than the first IoT device after detecting the change in the FoV of the camera.

10. The method of claim 1, further comprising:
determining the audio stream from the first IoT device is not received at the computing device for a period of time; and
determining to switch to recording the audio of the subject using a local microphone of the camera of the computing device in response to determining the audio stream from the first IoT device is not received at the computing device for the period of time.

11. The method of claim 1, wherein determining the plurality of IoT devices that are displayed within the FoV of the camera of the computing device and that are capable of remote audio recording and audio streaming comprises:
obtaining a map of locations of the plurality of IoT devices in a local network from a master device of the local network;
determining that the plurality of IoT devices each have a microphone and are capable of remote audio recording and audio streaming; and
displaying a visual indicator within the FoV of the camera for each of the plurality of IoT devices, the visual indicator indicating a location of each of the plurality of IoT devices within the FoV of the camera and indicating each of the plurality of IoT devices is capable of remote audio recording and audio streaming.

12. The method of claim 1, wherein determining the plurality of IoT devices that are displayed within the FoV of the camera of the computing device and that are capable of remote audio recording and audio streaming comprises at least one member selected from the group consisting of:
obtaining information from a master device of a local network, the information indicating which of the plurality of IoT devices are capable of remote audio recording and audio streaming; and
obtaining information from each of the plurality of IoT devices, the information indicating which of the plurality of IoT devices are capable of remote audio recording and audio streaming.

13. The method of claim 1, wherein the computing device is a mobile phone, a tablet computer, a pair of smart glasses, a dedicated camera, or a drone.

14. The method of claim 1, wherein determining, within the FoV of the camera of the computing device, the distance measurements from each of the plurality of IoT devices displayed within the FoV to the focal point of the FoV further comprises:
determining coordinates within the FoV of the camera for the focal point of the FoV, for the first IoT device displayed within the FoV, and for a second IoT device displayed within the FoV; and
determining the distance measurements, within the FoV of the camera, from each of the plurality of IoT devices displayed within the FoV to the focal point of the FoV based, at least in part, on the coordinates within the FoV of the camera.

15. A computing device, comprising:
a processor; and
memory having instructions stored therein which, when executed by the processor cause the computing device to:
determine a plurality of internet of things (IoT) devices that are displayed within a field of view (FoV) of a camera of the computing device and that are capable of remote audio recording and audio streaming;
determine, within the FoV of the camera of the computing device, distance measurements from each of the plurality of IoT devices displayed within the FoV to a focal point of the FoV;
select a first IoT device from the plurality of IoT devices based, at least in part, on the distance measurements, the first IoT device having a first microphone that is capable of remotely recording audio of a subject for the computing device; and
receive an audio stream from the first IoT device after selection of the first IoT device, the audio stream including the audio of the subject remotely recorded by the first IoT device for the computing device.

16. The computing device of claim 15, wherein the instructions, when executed by the processor to select the first IoT device from the plurality of IoT devices based, at least in part, on the distance measurements, further cause the computing device to:
determine, based on the distance measurements, that the first IoT device from the plurality of IoT devices is located closest to the focal point of the FoV; and
select the first IoT device from the plurality of IoT devices based, at least in part, on a determination that the first IoT device is located closest to the focal point of the FoV.

17. The computing device of claim 15, wherein the instructions, when executed by the processor, further cause the computing device to:
determine a microphone type and performance characteristics associated with each microphone of each of the plurality of IoT devices; and compare the microphone type and performance characteristics associated with each microphone of each of the plurality of IoT devices,
  wherein selection of the first IoT device from the plurality of IoT devices is further based, at least in part, on the microphone type and performance characteristics associated with the first microphone of the first IoT device.

18. The computing device of claim 15, wherein the instructions, when executed by the processor, further cause the computing device to:
  receive user input selecting the first IoT device having the first microphone,
  wherein selection of the first IoT device from the plurality of IoT devices is further based, at least in part, on the user input.

19. The computing device of claim 15, wherein the instructions, when executed by the processor, further cause the computing device to:
  record video of the subject using the camera of the computing device; and
  generate an A/V recording of the subject using the video of the subject recorded by the camera of the computing device and the audio of the subject remotely recorded by the first microphone of the first IoT device.

20. The computing device of claim 15, wherein the instructions, when executed by the processor, further cause the computing device to:
  detect a change in the FoV of the camera of the computing device; and
  determine to switch from reception of the audio stream from the first IoT device to reception of an audio stream from a second IoT device after detection of the change in the FoV of the camera, the second IoT device having a second microphone that is capable of remotely recording the audio of the subject.

21. The computing device of claim 15, wherein the instructions, when executed by the processor to determine the plurality of IoT devices that are displayed within the FoV of the camera of the computing device and that are capable of remote audio recording and audio streaming, further cause the computing device to:
  obtain a map of locations of the plurality of IoT devices in a local network from a master device of the local network;
  determine that the plurality of IoT devices each have a microphone and are capable of remote audio recording and audio streaming; and
  display a visual indicator within the FoV of the camera for each of the plurality of IoT devices, the visual indicator indicating a location of each of the plurality of IoT devices within the FoV of the camera and indicating each of the plurality of IoT devices is capable of remote audio recording and audio streaming.

22. A non-transitory computer-readable storage medium having instructions stored therein, which when executed by a processor of a computing device, cause the computing device to:
  determine a plurality of internet of things (IoT) devices that are displayed within a field of view (FoV) of a camera of the computing device and that are capable of remote audio recording and audio streaming;
  determine, within the FoV of the camera of the computing device, distance measurements from each of the plurality of IoT devices displayed within the FoV to a focal point of the FoV;
  select a first IoT device from the plurality of IoT devices based, at least in part, on the distance measurements, the first IoT device having a first microphone that is capable of remotely recording audio of a subject for the computing device; and
  receive an audio stream from the first IoT device after selection of the first IoT device, the audio stream including the audio of the subject remotely recorded by the first IoT device for the computing device.

23. The non-transitory computer-readable storage medium of claim 22, wherein the instructions, when executed by the processor, further cause the computing device to:
  determine, based on the distance measurements, that the first IoT device from the plurality of IoT devices is located closest to the focal point of the FoV; and
  select the first IoT device from the plurality of IoT devices based, at least in part, on a determination that the first IoT device is located closest to the focal point of the FoV.

24. The non-transitory computer-readable storage medium of claim 22, wherein the instructions, when executed by the processor, further cause the computing device to:
  determine a microphone type and performance characteristics associated with each microphone of each of the plurality of IoT devices; and
  compare the microphone type and performance characteristics associated with each microphone of each of the plurality of IoT devices,
  wherein selection of the first IoT device from the plurality of IoT devices is further based, at least in part, on the microphone type and performance characteristics associated with the first microphone of the first IoT device.

25. The non-transitory computer-readable storage medium of claim 22, wherein the instructions, when executed by the processor, further cause the computing device to:
  detect a change in the FoV of the camera of the computing device; and
  determine to switch from reception of the audio stream from the first IoT device to reception of an audio stream from a second IoT device after detection of the change in the FoV of the camera, the second IoT device having a second microphone that is capable of remotely recording the audio of the subject.

* * * * *